United States Patent
Shen et al.

(10) Patent No.: US 10,853,969 B2
(45) Date of Patent: Dec. 1, 2020

(54) METHOD AND SYSTEM FOR DETECTING OBSTRUCTIVE OBJECT AT PROJECTED LOCATIONS WITHIN IMAGES

(71) Applicant: SZ DJI TECHNOLOGY CO., LTD., Shenzhen (CN)

(72) Inventors: Shaojie Shen, Shenzhen (CN); Xianliang Wu, Shenzhen (CN); Liansheng Chen, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/285,373

(22) Filed: Feb. 26, 2019

(65) Prior Publication Data

US 2019/0188879 A1     Jun. 20, 2019

Related U.S. Application Data

(63) Continuation of application No. PCT/CN2016/097367, filed on Aug. 30, 2016.

(51) Int. Cl.
*H04N 7/18* (2006.01)
*G06T 7/73* (2017.01)
(Continued)

(52) U.S. Cl.
CPC ............ *G06T 7/74* (2017.01); *A63H 27/12* (2013.01); *A63H 30/04* (2013.01); *B64C 39/024* (2013.01);
(Continued)

(58) Field of Classification Search
CPC ... G06T 7/74; G06T 7/73; G06T 2207/10021; G06T 2207/30232; G06T 2207/30204;
(Continued)

(56) References Cited

U.S. PATENT DOCUMENTS 7,196,305 B2 * 3/2007 Shaffer .................... B60S 1/08
                                                  250/208.1
9,245,333 B1    1/2016 Beck et al.
(Continued)

FOREIGN PATENT DOCUMENTS

CN    103364785 A    10/2013
CN    105259917 A    1/2016
(Continued)

OTHER PUBLICATIONS

The World Intellectual Property Organization (WIPO) The International Search Report and Written Opinion for PCT/CN2016/097367 May 3, 2017 6 pages.

*Primary Examiner* — Shan E Elahi
(74) *Attorney, Agent, or Firm* — Anova Law Group, PLLC

(57) ABSTRACT

A method for supporting image processing for a movable object includes acquiring one or more images captured by an imaging device borne by the movable object. The imaging device is at least partially blocked by an obstructive object attached to the movable object. The method further includes applying a template to the one or more images to obtain one or more projected locations of the obstructive object within the one or more images and detecting at least portion of the obstructive object at the one or more projected locations within the one or more images.

19 Claims, 18 Drawing Sheets

(51) Int. Cl.
| | |
|---|---|
| *B64C 39/02* | (2006.01) |
| *G06K 9/00* | (2006.01) |
| *G06K 9/46* | (2006.01) |
| *G06K 9/62* | (2006.01) |
| *A63H 30/04* | (2006.01) |
| *A63H 27/00* | (2006.01) |
| *B64D 47/08* | (2006.01) |
| *G01V 8/10* | (2006.01) |

(52) U.S. Cl.
CPC .............. *B64D 47/08* (2013.01); *G01V 8/10* (2013.01); *G06K 9/0063* (2013.01); *G06K 9/4661* (2013.01); *G06K 9/6202* (2013.01); *G06T 7/73* (2017.01); *B64C 2201/123* (2013.01); *B64C 2201/127* (2013.01); *G06T 2207/10021* (2013.01); *G06T 2207/10032* (2013.01); *G06T 2207/30204* (2013.01); *G06T 2207/30232* (2013.01); *G06T 2207/30261* (2013.01)

(58) Field of Classification Search
CPC ........... G06T 2207/10032; G06T 2207/30261; A63H 30/04; A63H 27/12; B64D 47/08; G01V 8/10; G06K 9/0063; G06K 9/4661; G06K 9/6202; B64C 39/024; B64C 2201/127; B64C 2201/123
USPC .......................................................... 348/144
See application file for complete search history.

(56) References Cited

U.S. PATENT DOCUMENTS

| | | | |
|---|---|---|---|
| 2007/0093945 A1* | 4/2007 | Grzywna | G01C 21/005 701/23 |
| 2009/0122133 A1* | 5/2009 | Hartman | H04N 13/218 348/42 |
| 2011/0043624 A1 | 2/2011 | Haug et al. | |
| 2012/0050524 A1* | 3/2012 | Rinner | G06T 3/40 348/117 |
| 2015/0321094 A1* | 11/2015 | Wei | A63F 13/02 463/31 |
| 2015/0362917 A1 | 12/2015 | Wang et al. | |
| 2016/0241767 A1* | 8/2016 | Cho | G06F 3/0346 |
| 2017/0036771 A1* | 2/2017 | Woodman | B64D 47/08 |

FOREIGN PATENT DOCUMENTS

| | | |
|---|---|---|
| CN | 105278759 A | 1/2016 |
| EP | 2665039 A2 | 11/2013 |
| JP | 2000123151 A | 4/2000 |
| JP | 2001264027 A | 9/2001 |
| JP | 2007060273 A | 3/2007 |

\* cited by examiner

1000

1002
Acquire one or more images captured by an imaging device borne by a movable object, wherein the imaging device is at least partially blocked by an obstructive object attached to the movable object

1008
The imaging device is fixedly mounted on the movable object (A)

1004
Apply a template to the one or more images to obtain one or more projected locations of the obstructive object within the one or more images

1024
The template includes a pattern representing one or more projected locations of at least portion of the obstructive object during a rotational motion of the obstructive object

1026
The pattern comprises one or more lines respectively representing the one or more projected locations of the obstructive object during the rotational motion, each line associated with a rotation angle of a corresponding projected location (B)  (C)

1006
Detect at least portion of the obstructive object at the one or more projected locations within the one or more images

1028
Determine whether at least portion of the obstructive object are located on the one or more lines in the first image.

1010
The obstructive object includes at least a portion of a blade of a propeller system for providing a motion of the movable object

1012
The blade comprises a plurality of markers distributed on a lower surface of the blade facing the imaging device

1014
Each marker of the plurality of markers is made of a reflective material

1016
Illuminate the one or more markers on the blade using an illumination source mounted on the movable object

1018
Each marker is an arc stripe on a respective concentric circle of a plurality of concentric circles with a common central axis, around which the blade is configured to rotate

1020
The plurality of markers comprise multiple groups of stripes with different widths, which are alternatingly distributed near an outer edge of the blade

1022
Each group of stripes include 3 to 5 stripes

1102
Acquire one or more images captured by an imaging device borne by the movable object, wherein the imaging device is at least partially blocked by an obstructive object attached to the movable object

1108
The obstructive object includes at least a portion of a blade of a propeller system for providing a motion of the movable object

1110
The blade comprises a plurality of reflective stripes distributed on a lower surface of the blade facing the imaging device

1104
Detect at least portion of the obstructive object projected in the one or more images

1106
Process the one or more images with the projected obstructive object to assist an operation of the movable object

 

---
1112
Apply a template to the one or more images to obtain one or more projected locations of the obstructive object within the one or more images 1114
The template includes one or more lines respectively representing the one or more projected locations of the obstructive object during a rotational motion, wherein each line is associated with a rotation angle of a corresponding projected location 1116
The template comprises a first group of markers distributed on the one or more lines, and a second group of markers distributed on motion trails of the reflective stripes of the blade during the rotational motion

---

1118
Collect pixels in the first image corresponding to the first group of markers and the second group of markers in the template 1120
Determine whether pixel values of the collected pixels corresponding to each line of the one or more lines satisfy predetermined criteria 1122
In accordance with a determination that the pixel values of the collected pixels corresponding to a first line satisfy the predetermined criteria, identify that the obstructive object exists at a first rotation angle associated with the first line in the first image

Figure 11B

METHOD AND SYSTEM FOR DETECTING OBSTRUCTIVE OBJECT AT PROJECTED LOCATIONS WITHIN IMAGES

CROSS-REFERENCE TO RELATED APPLICATION

This application is a continuation of International Application No. PCT/CN2016/097367, filed on Aug. 30, 2016, the entire contents of which are incorporated herein by reference.

TECHNICAL FIELD

The disclosed embodiments relate generally to image processing and more particularly, but not exclusively, to processing images based on detection of an obstructive object at projected locations within the images captured by a movable object.

BACKGROUND

Movable objects such as unmanned aerial vehicles (UAVs) can be used for performing surveillance, reconnaissance, and exploration tasks for military and civilian applications. A movable object may include one or more imaging devices configured to perform specific function(s), such as capturing images of the surrounding environment for obstacle avoidance and/or for target tracking. It is therefore important to maintain information accuracy in the captured images, for example, by detecting and processing image information that may not correspond to obstacle(s) and/or target(s) of the surrounding environment.

SUMMARY

There is a need for systems and methods for efficiently and accurately processing images captured by one or more imaging devices borne by a movable object for obstacle avoidance, navigation and orientation, image capturing and processing, and/or target tracking. Such systems and methods optionally complement or replace conventional methods for processing images captured by a movable object. In some embodiments, one or more obstructive objects borne by the movable object may partially block the imaging devices of the movable object. By using a template to detect the obstructive objects at projected locations in the captured images and to process the images accordingly, some embodiments of the present application can significantly improve the efficiency and accuracy of imaging processing for navigation and orientation, image capturing and processing, obstacle avoidance, and/or target tracking. Furthermore, the design flexibility of the movable object can be enhanced by reducing limitations of the relative positions between the imaging devices and the obstructive objects.

In accordance with some embodiments, a method for supporting image processing for a movable object comprises: acquiring one or more images captured by an imaging device borne by a movable object. The imaging device is at least partially blocked by an obstructive object attached to the movable object. The method further comprises applying a template to the one or more images to obtain one or more projected locations of the obstructive object within the one or more images. The method also comprises detecting at least portion of the obstructive object at the one or more projected locations within the one or more images.

In accordance with some embodiments, an unmanned aerial vehicle (UAV) may comprise a propulsion system, one or more sensors, an imaging device, and one or more processors coupled to the propulsion system, the one or more sensors, and the imaging device. The one or more processors are configured for performing the operations of the above method. In accordance with some embodiments, a system may comprise one or more processors; memory; and one or more programs stored in the memory and configured to be executed by the one or more processors. The one or more programs including instructions for performing the operations of the above method. In accordance with some embodiments, a non-transitory computer-readable storage medium has stored therein instructions that, when executed by the movable object, cause the movable object to perform the operations of the above method.

In accordance with some embodiments, a method for controlling a movable object comprises: acquiring one or more images captured by an imaging device borne by a movable object. The imaging device is at least partially blocked by an obstructive object attached to the movable object. The method further comprises detecting at least portion of the obstructive object projected in the one or more images. The method also comprises processing the one or more images with the projected obstructive object to assist an operation of the movable object.

In accordance with some embodiments, an unmanned aerial vehicle (UAV) may comprise a propulsion system, one or more sensors, an imaging device, and one or more processors coupled to the propulsion system, the one or more sensors, and the imaging device. The one or more processors are configured for performing the operations of the above method. In accordance with some embodiments, a system may comprise one or more processors; memory; and one or more programs stored in the memory and configured to be executed by the one or more processors. The one or more programs including instructions for performing the operations of the above method. In accordance with some embodiments, a non-transitory computer-readable storage medium has stored therein instructions that, when executed by the movable object, cause the movable object to perform the operations of the above method.

BRIEF DESCRIPTION OF THE DRAWINGS

FIGS. 10A-10F are a flow diagram illustrating a method for supporting image processing for a movable object, in accordance with some embodiments.

FIGS. 11A-11C are a flow diagram illustrating a method for controlling a movable object, in accordance with some embodiments.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

The following description uses an unmanned aerial vehicle (UAV) as an example of a movable object. UAVs include, e.g., fixed-wing aircrafts and rotary-wing aircrafts such as helicopters, quadcopters, and aircraft having other numbers and/or configurations of rotors. It will be apparent to those skilled in the art that other types of movable objects may be substituted for UAVs as described below.

The present disclosure provides techniques related to processing images captured by UAVs for navigation and orientation, image capturing and processing, obstacle avoidance and/or target tracking. The images can be processed using a template to detect obstructive objects at projected locations in the images. The image processing techniques can provide efficiency and accuracy in obstacle avoidance and/or target tracking, and flexibility in design and manufacture of UAVs. As a result, the cost for designing and manufacturing the movable object with an imaging device onboard can be reduced.

Figure 1:
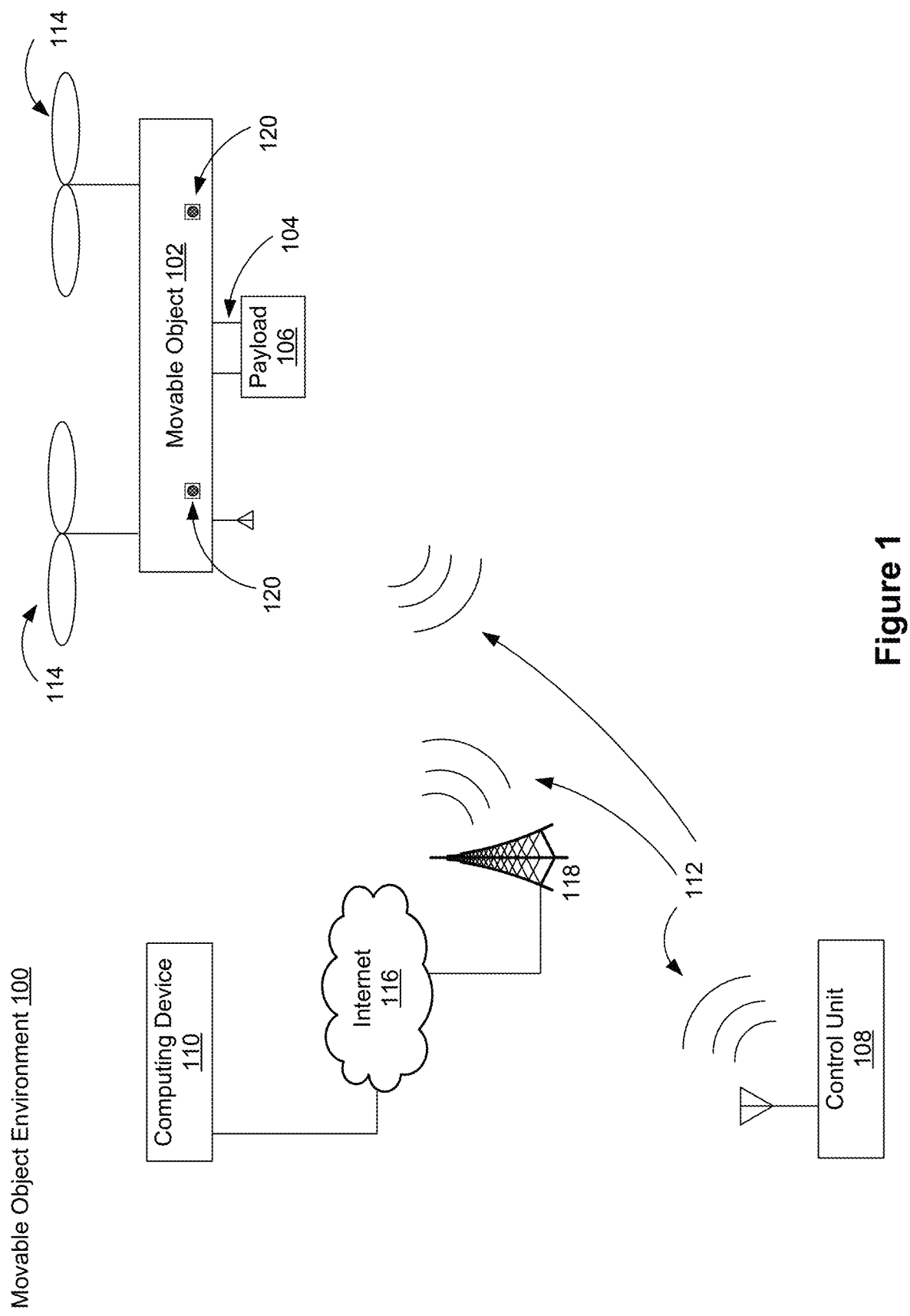
FIG. 1 illustrates a movable object environment, in accordance with some embodiments.

FIG. 1 illustrates a movable object environment 100, in accordance with some embodiments. The movable object environment 100 includes a movable object 102. In some embodiments, the movable object 102 includes a carrier 104 and/or a payload 106. In some embodiments, the movable object 102 also includes one or more (e.g., a pair of) imaging sensors 120 for capturing images of surrounding environment.

In some embodiments, the carrier 104 is used to couple the payload 106 to the movable object 102. In some embodiments, the carrier 104 includes an element (e.g., a gimbal and/or damping element) to isolate the payload 106 from movement of the movable object 102 and/or the movement mechanism 114. In some embodiments, the carrier 104 includes an element for controlling movement of the payload 106 relative to the movable object 102.

In some embodiments, the payload 106 is coupled (e.g., rigidly coupled) to the movable object 102 (e.g., coupled via carrier 104) such that the payload 106 remains substantially stationary relative to movable object 102. For example, the carrier 104 is coupled to the payload 106 such that the payload is not movable relative to the movable object 102. In some embodiments, the payload 106 is mounted directly to the movable object 102 without requiring the carrier 104. In some embodiments, the payload 106 is located partially or fully within the movable object 102.

In some embodiments, the imaging sensors 120 are mounted to the exterior, located within, or otherwise coupled to movable object 102. In some embodiments, the imaging sensors 120 are fixedly mounted to the movable object 102. For example, a relative position between a certain imaging sensor 120 and a stationary (or a fixed) component of the movable object 102 is fixed. In some embodiments, the imaging sensors 120 are components of a movable object sensing system 210, such as a carrier sensing system and/or a payload sensing system. The imaging sensors 120, along with other components of the movable object sensing system 122, capture environmental information, generates static sensing data (e.g., a single image captured in response to a received instruction) and/or dynamic sensing data (e.g., a series of images captured at a periodic rate, such as a video). More details about the imaging sensors 120 will be discussed with reference to FIG. 2.

In some embodiments, a control unit 108 communicates with the movable object 102, e.g., to provide control instructions to the movable object 102 and/or to display information received from the movable object 102. Although the control unit 108 is typically a portable (e.g., handheld) device, the control unit 108 need not be portable. In some embodiments, the control unit 108 is a dedicated control device (e.g., for the movable object 102), a laptop computer, a desktop computer, a tablet computer, a gaming system, a wearable device (e.g., glasses, a glove, and/or a helmet), a microphone, a portable communication device (e.g., a mobile telephone) and/or a combination thereof.

In some embodiments, an input device of the control unit 108 receives user input to control aspects of the movable object 102, the carrier 104, the payload 106, and/or a component thereof. Such aspects include, e.g., orientation, position, orientation, velocity, acceleration, navigation, and/or tracking. For example, a position of an input device of the control unit 108 (e.g., a position of a component of the input device) is manually set by a user to a position corresponding to an input (e.g., a predetermined input) for controlling the movable object 102. In some embodiments, the input device is manipulated by a user to input control instructions for controlling the navigation of the movable object 102. In some embodiments, an input device of control unit 108 is used to input a flight mode for the movable object 102, such as auto pilot or navigation according to a predetermined navigation path.

In some embodiments, a display of the control unit 108 displays information generated by the movable object sensing system 210, the memory 204, and/or another system of the movable object 102. For example, the display displays information about the movable object 102, the carrier 104, and/or the payload 106, such as position, orientation, orientation, movement characteristics of the movable object 102, and/or distance between the movable object 102 and another object (e.g., a target and/or an obstacle). In some embodiments, information displayed by a display of control unit 108 includes images captured by an imaging device 216 (FIG. 2), tracking data (e.g., a graphical tracking indicator applied to a representation of a target), and/or indications of control data transmitted to the movable object 102. In some embodiments, information displayed by the display of the control unit 108 is displayed in substantially real-time as information is received from the movable object 102 and/or as image data is acquired. In some embodiments, the display of the control unit 108 is a touchscreen display.

In some embodiments, the movable object environment 100 includes a computing device 110. The computing device 110 is, e.g., a server computer, a cloud server, a desktop computer, a laptop computer, a tablet, or another portable electronic device (e.g., a mobile telephone). In some embodiments, the computing device 110 is a base station that communicates (e.g., wirelessly) with the movable object 102 and/or the control unit 108. In some embodiments, the computing device 110 provides data storage, data retrieval, and/or data processing operations, e.g., to reduce the processing power and/or data storage requirements of the movable object 102 and/or the control unit 108. For example, the computing device 110 is communicatively connected to a database and/or the computing device 110 includes a database. In some embodiments, the computing device 110 is used in lieu of or in addition to the control unit 108 to perform any of the operations described with regard to the control unit 108.

In some embodiments, the movable object 102 communicates with a control unit 108 and/or a computing device 110, e.g., via wireless communications 112. In some embodiments, the movable object 102 receives information from the control unit 108 and/or the computing device 110. For example, information received by the movable object 102 includes, e.g., control instructions for controlling movable object 102. In some embodiments, the movable object 102 transmits information to the control unit 108 and/or the computing device 110. For example, information transmitted by the movable object 102 includes, e.g., images and/or video captured by the movable object 102.

In some embodiments, communications between the computing device 110, the control unit 108 and/or the movable object 102 are transmitted via a network (e.g., Internet 116) and/or a wireless signal transmitter (e.g., a long range wireless signal transmitter) such as a cellular tower 118. In some embodiments, a satellite (not shown) is a component of Internet 116 and/or is used in addition to or in lieu of the cellular tower 118.

In some embodiments, information communicated between the computing device 110, the control unit 108 and/or the movable object 102 include control instructions. Control instructions include, e.g., navigation instructions for controlling navigational parameters of the movable object 102 such as position, orientation, orientation, and/or one or more movement characteristics of the movable object 102, the carrier 104, and/or the payload 106. In some embodiments, control instructions include instructions directing movement of one or more of the movement mechanisms 114. For example, control instructions are used to control flight of a UAV.

In some embodiments, control instructions include information for controlling operations (e.g., movement) of the carrier 104. For example, control instructions are used to control an actuation mechanism of the carrier 104 so as to cause angular and/or linear movement of the payload 106 relative to the movable object 102. In some embodiments, control instructions adjust movement of the carrier 104 relative to the movable object 102 with up to six degrees of freedom.

In some embodiments, control instructions are used to adjust one or more operational parameters for the payload 106. For example, control instructions include instructions for adjusting an optical parameter (e.g., an optical parameter of the imaging device 216). In some embodiments, control instructions include instructions for adjusting imaging properties and/or image device functions, such as capturing an image, initiating/ceasing video capture, powering an imaging device 216 on or off, adjusting an imaging mode (e.g., capturing still images or capturing video), adjusting a distance between left and right components of a stereographic imaging system, and/or adjusting a position, orientation, and/or movement (e.g., pan rate, pan distance) of a carrier 104, a payload 106 and/or an imaging device 216.

In some embodiments, when control instructions are received by movable object 102, the control instructions change parameters of and/or are stored by memory 204 (FIG. 2) of movable object 102.

Figure 2:
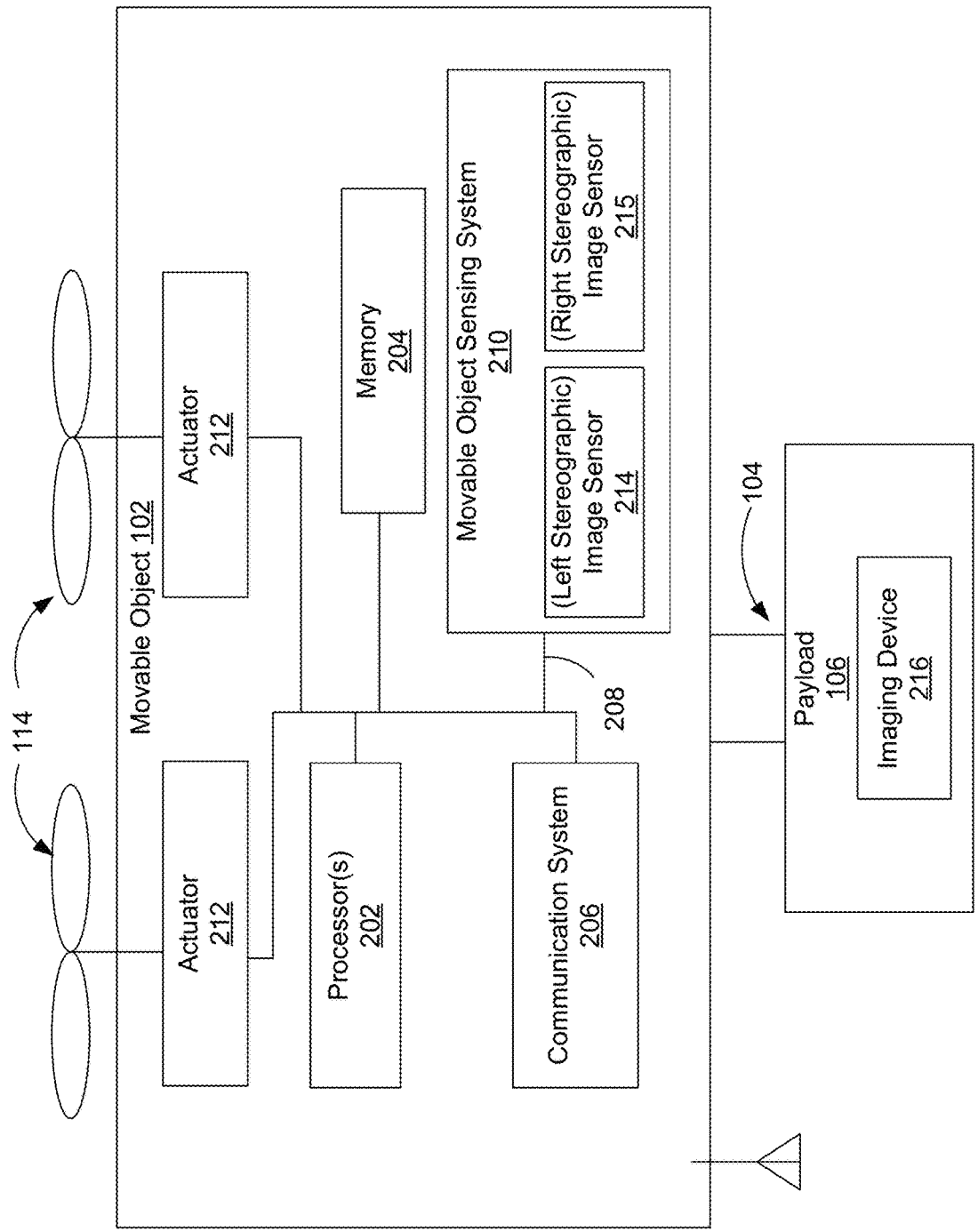
FIG. 2 illustrates a movable object, in accordance with some embodiments.

FIG. 2 illustrates an exemplary movable object 102, in accordance with some embodiments. The movable object 102 typically includes one or more processor(s) 202, a memory 204, a communication system 206, a movable object sensing system 210, and one or more communication buses 208 for interconnecting these components.

In some embodiments, the movable object 102 is a UAV and includes components to enable flight and/or flight control. In some embodiments, the movable object 102 includes communication system 206 with one or more network or other communications interfaces (e.g., via which flight control instructions are received), one or more movement mechanisms 114, and/or one or more movable object actuators 212 (e.g., to cause movement of movement mechanisms 114 in response to received control instructions). Although the movable object 102 is depicted as an aircraft, this depiction is not intended to be limiting, and any suitable type of movable object can be used.

In some embodiments, the movable object 102 includes movement mechanisms 114 (e.g., propulsion mechanisms). Although the plural term "movement mechanisms" is used herein for convenience of reference, "movement mechanisms 114" refers to a single movement mechanism (e.g., a single propeller) or multiple movement mechanisms (e.g., multiple rotors). The movement mechanisms 114 include one or more movement mechanism types such as rotors, propellers, blades, engines, motors, wheels, axles, magnets, nozzles, and so on. The movement mechanisms 114 are coupled to the movable object 102 at, e.g., the top, bottom, front, back, and/or sides. In some embodiments, the movement mechanisms 114 of a single movable object 102 include multiple movement mechanisms of the same type. In some embodiments, the movement mechanisms 114 of a single movable object 102 include multiple movement mechanisms with different movement mechanism types. The movement mechanisms 114 are coupled to the movable object 102 using any suitable means, such as support elements (e.g., drive shafts) and/or other actuating elements (e.g., the movable object actuators 212). For example, a movable object actuator 212 receives control signals from the processor(s) 202 (e.g., via the control bus 208) that activates the movable object actuator 212 to cause movement of a movement mechanism 114. For example, the processor(s) 202 include an electronic speed controller that provides control signals to a movable object actuator 212.

In some embodiments, the movement mechanisms 114 enable the movable object 102 to take off vertically from a surface or land vertically on a surface without requiring any horizontal movement of the movable object 102 (e.g., without traveling down a runway). In some embodiments, the movement mechanisms 114 are operable to permit the movable object 102 to hover in the air at a specified position and/or orientation. In some embodiments, one or more of the movement mechanisms 114 are controllable independently of one or more of the other movement mechanisms 114. For example, when the movable object 102 is a quadcopter, each rotor of the quadcopter is controllable independently of the other rotors of the quadcopter. In some embodiments, multiple movement mechanisms 114 are configured for simultaneous movement.

In some embodiments, the movement mechanisms 114 include multiple rotors that provide lift and/or thrust to the movable object 102. The multiple rotors are actuated to provide, e.g., vertical takeoff, vertical landing, and hovering capabilities to the movable object 102. In some embodiments, one or more of the rotors spin in a clockwise direction, while one or more of the rotors spin in a counterclockwise direction. For example, the number of clockwise rotors is equal to the number of counterclockwise rotors. In some embodiments, the rotation rate of each of the rotors is independently variable, e.g., for controlling the lift and/or thrust produced by each rotor, and thereby adjusting the spatial disposition, velocity, and/or acceleration of the movable object 102 (e.g., with respect to up to three degrees of translation and/or up to three degrees of rotation).

In some embodiments, the memory 204 stores one or more instructions, programs (e.g., sets of instructions), modules, controlling systems and/or data structures, collectively referred to as "elements" herein. One or more elements described with regard to the memory 204 are optionally stored by the control unit 108, the computing device 110, and/or another device. In some embodiments, imaging device 216 includes memory that stores one or more parameters described with regard to the memory 204.

In some embodiments, the memory 204 stores a controlling system configuration that includes one or more system settings (e.g., as configured by a manufacturer, administrator, and/or user). For example, identifying information for the movable object 102 is stored as a system setting of the system configuration. In some embodiments, the controlling system configuration includes a configuration for the imaging device 216. The configuration for the imaging device 216 stores parameters such as position, zoom level and/or focus parameters (e.g., amount of focus, selecting autofocus or manual focus, and/or adjusting an autofocus target in an image). Imaging property parameters stored by the imaging device configuration include, e.g., image resolution, image size (e.g., image width and/or height), aspect ratio, pixel count, quality, focus distance, depth of field, exposure time, shutter speed, and/or white balance. In some embodiments, parameters stored by the imaging device configuration are updated in response to control instructions (e.g., generated by processor(s) 202 and/or received by the movable object 102 from control unit 108 and/or the computing device 110). In some embodiments, parameters stored by the imaging device configuration are updated in response to information received from the movable object sensing system 210 and/or the imaging device 216.

In some embodiments, a controlling system performs imaging device adjustment. The imaging device adjustment module stores, e.g., instructions for adjusting a distance between an image sensor and an optical device of an imaging device 216, e.g., instructions for controlling an imaging device actuator. In some embodiments, one or more instructions for performing imaging device adjustment are stored in the memory 204.

In some embodiments, the controlling system performs an autofocus operation. For example, the autofocus operation is performed, e.g., periodically, when a device determines from image analysis that a focus level has fallen below a focus level threshold, in response a determination that movable object 102 and/or an image subject (e.g., a target or a remote object) has moved by more than a threshold distance, and/or in response to user input. In some embodiments, user input (e.g., received at control unit 108 and/or computing device 110) initiates and/or adjusts an autofocus mode. In some embodiments, user input indicates one or more regions (e.g., in an image captured by imaging device 216, such as an image displayed by control unit 108 and/or computing device 110) to be used and/or prioritized for an autofocus operation. In some embodiments, the autofocus module generates control instructions for moving an optical device relative to an image sensor in accordance with an image distance value determined by an image distance determination module. In some embodiments, one or more instructions for performing an autofocus operation are stored in the memory 204.

In some embodiments, the controlling system performs image distance determination, e.g., to determine an object distance and/or an image distance in accordance with the operations described herein. For example, the image distance determination module uses sensor data from one or more depth sensors and one or more orientation sensors of a movable object to determine an image distance and generate a control instruction for moving an optical device relative to an image sensor in accordance with the determined image distance. In some embodiments, one or more instructions for performing image distance determination are stored in the memory 204.

The above identified controlling system, modules, and/or programs (e.g., sets of instructions) need not be implemented as separate software programs, procedures or modules, and thus various subsets of these modules may be combined or otherwise re-arranged in various embodiments, and stored in the memory 204. In some embodiments, the controlling system includes a subset of the modules and data structures identified above. Furthermore, the memory 204 may store additional modules and data structures not described above. In some embodiments, the programs, modules, and data structures stored in the memory 204, or a non-transitory computer readable storage medium of memory 204, provide instructions for implementing respective operations in the methods described below. In some embodiments, some or all of these modules may be implemented with specialized hardware circuits that subsume part or all of the module functionality. One or more of the above identified elements may be executed by one or more processors 202 of the movable object 102. In some embodiments, one or more of the above identified modules are stored on one or more storage devices of a device remote from the movable object (such as memory of the control unit 108, the computing device 110, and/or the imaging device 216) and/or executed by one or more processors of a device remote from the movable object 102 (such as processor(s) of the control unit 108, the computing device 110, and/or the imaging device 216).

The communication system 206 enables communication with the control unit 108 and/or the computing device 110, e.g., via wireless signals 112. The communication system 206 includes, e.g., transmitters, receivers, and/or transceivers for wireless communication. In some embodiments, the communication is one-way communication, such that data is only received by the movable object 102 from the control unit 108 and/or the computing device 110, or vice-versa. In some embodiments, communication is two-way communication, such that data is transmitted in both directions between the movable object 102 and the control unit 108 and/or the computing device 110. In some embodiments, the movable object 102, the control unit 108, and/or the computing device 110 are connected to the Internet 116 or other telecommunications network, e.g., such that data generated by the movable object 102, the control unit 108, and/or the computing device 110 is transmitted to a server for data storage and/or data retrieval (e.g., for display by a website).

In some embodiments, the sensing system 210 of the movable object 102 includes one or more sensors. In some embodiments, one or more sensors of the movable object sensing system 210 are mounted to the exterior, located within, or otherwise coupled to the movable object 102. In some embodiments, one or more sensors of the movable object sensing system 210 are components of and/or coupled to the carrier 104, the payload 106, and/or the imaging device 216. Where sensing operations are described herein as being performed by the movable object sensing system 210, it will be recognized that such operations are optionally performed by one or more sensors of the carrier 104, the payload 106, and/or the imaging device 216 in addition to and/or in lieu of one or more sensors of the movable object sensing system 210.

In some embodiments, movable object sensing system 210 includes one or more image sensors 120, such as image sensor 214 (e.g., a left stereographic image sensor) and/or image sensor 215 (e.g., a right stereographic image sensor). Image sensors 120 capture, e.g., images, image streams (e.g., videos), stereographic images, and/or stereographic image streams (e.g., stereographic videos). Image sensors 120 detect light, such as visible light, infrared light, and/or ultraviolet light. In some embodiments, movable object sensing system 210 includes one or more optical devices (e.g., lenses) to focus or otherwise alter the light onto one or more image sensors 120. In some embodiments, image sensors 120 include, e.g., semiconductor charge-coupled devices (CCD), active pixel sensors using complementary metal-oxide-semiconductor (CMOS) or N-type metal-oxide-semiconductor (NMOS, Live MOS) technologies, or any other types of sensors. The imaging sensors 120 can be used for detecting an object (e.g., an obstacle or a target), detecting location information of the object, generating a depth map (e.g., using stereographic image sensors 214 and 215), avoiding an obstacle, and/or tracking a target.

In some embodiments, the movable object sensing system 210 includes one or more audio transducers (e.g., a speaker, a microphone, a parabolic microphone, a sonar system), one or more infrared sensors, one or more sensor pairs (e.g., left stereographic image sensor 214 and right stereographic image sensor 215; audio output transducer and audio input transducer; and/or left infrared sensor and right infrared sensor), one or more global positioning system (GPS) sensors, motion sensors (e.g., accelerometers), rotation sensors (e.g., gyroscopes), inertial sensors, proximity sensors (e.g., infrared sensors), and/or weather sensors (e.g., pressure sensor, temperature sensor, moisture sensor, and/or wind sensor).

In some embodiments, sensing data generated by one or more sensors of movable object sensing system 210 and/or information determined using sensing data from one or more sensors of movable object sensing system 210 are transmitted to control unit 108 (e.g., via communication system 112). In some embodiments, data generated one or more sensors of movable object sensing system 210 and/or information determined using sensing data from one or more sensors of movable object sensing system 210 is stored by memory 204.

Figure 3:
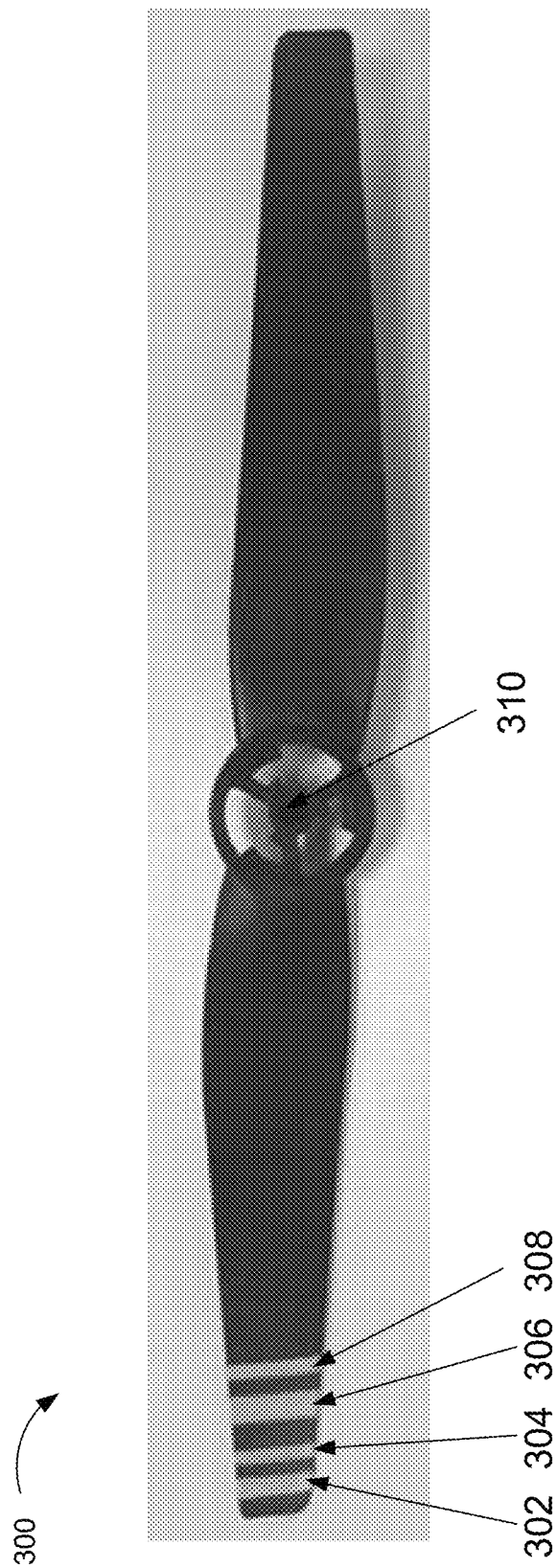
FIG. 3 is an image illustrating a blocking surface of an obstructive object, in accordance with some embodiments.

FIG. 3 is an image illustrating a blocking surface of an obstructive object, in accordance with some embodiments. In some embodiments, an obstructive object can be mounted on a movable object at a location that causes a blocking surface of the obstructive object to partially or completely block an imaging sensor (e.g., the imaging sensor 120 and/or the imaging device 216). In some embodiments, the obstructive object includes a blocking surface of a propeller 300 (also referred to as propeller blade 300) of the movable object 102 as shown in FIG. 3. In some embodiments, the blocking surface of the obstructive object comprises a lower surface of the propeller blade 300, such as the lower surface of the propeller blade 300 facing the imaging sensors 120. The lower surface of the propeller blade 300 can be illuminated by one or more illumination source mounted on the movable object 102 (e.g., FIGS. 4A-4B). The propeller 300 is a component of the movement mechanisms 114. For example, one or more propellers 300 can be coupled to the movable object 102 using one or more support elements (e.g., drive shafts) and/or one or more actuating elements (e.g., the movable object actuators 212). The propeller 300 can be powered by the movable object actuators 212 to rotate to cause the movable object 102 to lift and/or thrust. In some embodiments, the obstructive object includes another component of the movable object 102, such as an arm of the movable object or a landing gear of the movable object.

In some embodiments, the propeller 300 is mounted on the movable object 102 at a location that causes one or more blades of the propeller 300, e.g., one or more blocking surfaces of the one or more blades respectively, to partially or completely block an imaging sensor 120 during rotation of the propeller 300. As a result, one or more images captured by the imaging sensor 120 may include at least a portion of the blocking surface of the propeller blade 300 at one or more locations within the one or more images respectively. In order to detect the location(s) of the blocking surface of the obstructive object, e.g., the blocking surface of the propeller blade 300, within the captured images, such that the obstructive object, e.g., the propeller blade 300, is not mistaken as an obstacle or a target, the captured images are processed using a predetermined template related to the obstructive object, e.g., the propeller blade 300, for detecting and/or removing the images of at least a portion of the propeller blade 300.

In some embodiments, the propeller blade 300 includes one or more markers 302, 304, 306, and 308 distributed on the blocking surface of the blade 300. For example, the markers 302-308 are distributed on a lower surface of the blade 300 that faces the imaging sensors 120. In some embodiments, the propeller 300 includes one blade, two blades (such as two opposing blades as shown in FIG. 3), three blades, or any other number of blades. In some embodiments, the markers are distributed on only one blade of the one or more blades of the propeller 300 (e.g., FIG. 3). In some other embodiments, the markers are distributed on more than one blade of two or more blades of the propeller 300. In one example, the markers are distributed on each blade of the two or more blades of the propeller 300. Each blade of the one or more blades of the propeller 300 may be flat. Alternatively, each blade of the one or more blades of the propeller 300 may have a blade angle that varies from the blade root to the blade tip, thus the markers 302-308 can also be distributed on both upper and lower surfaces of the blade facing the imaging sensor 120 or the imaging device 216. In some embodiments, each marker of the markers 302-308 is made of a reflective material (e.g., phosphor). In some embodiments, the makers include one or more stripes as illustrated in FIG. 3. For example, each marker is an arc stripe on a respective circle of a plurality of circles, so that each arc stripe forms a motion trail in a respective circle of the plurality of circles when the propeller blade 300 is in a rotational motion. For example, the marker 302 is an arc stripe on a portion of a first circle, and the marker 304 is an arc stripe on a portion of a second circle that is different from the first circle. In some embodiments, the plurality of circles are concentric circles. In one example, a common central axis of the plurality of concentric circles is a central axis (through center point 310) around which the blade 300 is configured to rotate. In some other embodiments, a marker has other suitable shape, such as a rectangle, a square, or other polygons.

In some embodiments, the one or more markers 302-308 include multiple groups of stripes with different widths. The multiple groups of stripes may be alternatingly distributed on the blocking surface of the blade 300 such that the stripes on the obstructive object can be sufficiently distinguished from other objects in the environment with a stripe shape or with a stripe pattern, such as an obstacle or a target with a stripe pattern. For example, the markers (stripes) 302 and 306 belong to a first group of stripes each having a first width, and the markers (stripes) 304 and 308 belong to a second group of stripes each having a second width. The second width may be smaller than the first width. In some examples, the first width is 1-5 times the second width. In some preferable embodiments, the first width is 1.5-2.5 times the second width. In some embodiments, each group of stripes includes 1-5 stripes. In some preferable embodiments, each group of stripes includes 3-5 reflective stripes. In some embodiments as illustrated in FIG. 3, the markers are distributed near an outer edge of the blade 300, which is the farther end of the blade 300 from the central axis or the center 310.

Figure 4B:
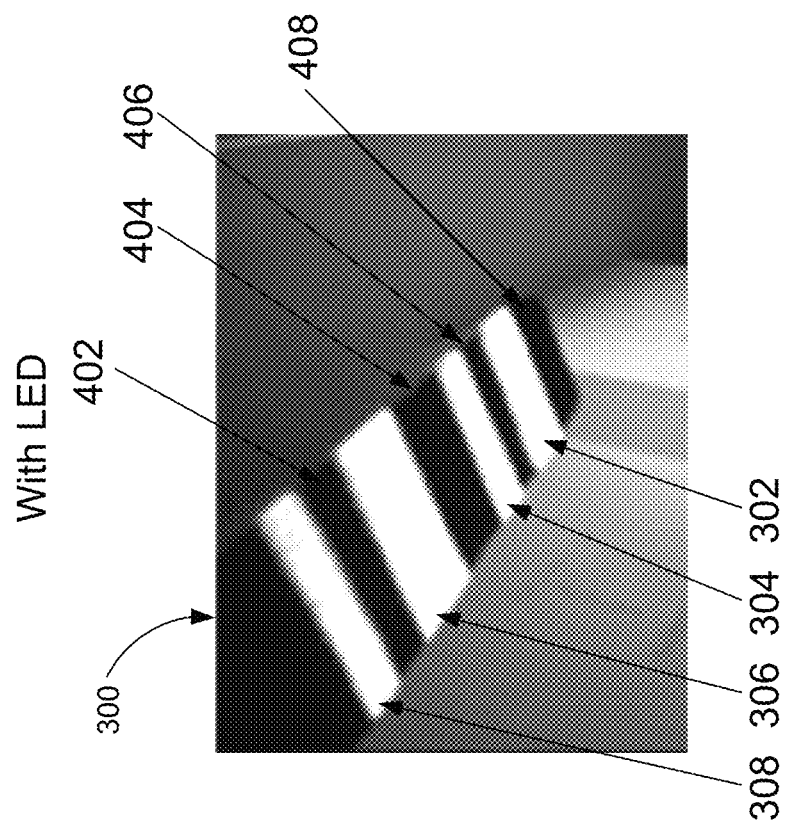
FIGS. 4A-4B illustrate a pair of images comparing a movable object without (FIG. 4A) and with (FIG. 4B) an illumination source shining at markers on a propeller blade, in accordance with some embodiments.
Figure 4A:
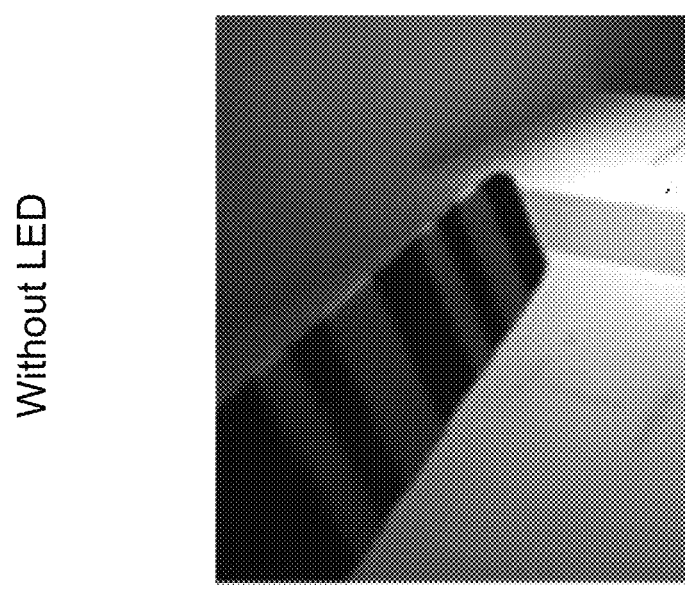

FIGS. 4A-4B illustrate a pair of images comparing a movable object without (FIG. 4A) and with (FIG. 4B) an illumination source shining at the markers on a propeller blade 300, in accordance with some embodiments. In some embodiments, an illumination source is mounted on the movable object 102 to illuminate the one or more markers 302-308. In some embodiments, the illumination source includes a fluorescent light source, an incandescent light source, a discharge light source, a neon and argon light source, a plasma light source, a light-emitting diode (LED) light source, an organic LED (OLED) light source, or any other suitable light source. In some embodiments, the illuminating source includes one or more white LEDs mounted on the removable object 102. As compared in FIGS. 4A and 4B, with an illumination source shinning at the markers on the blade 300, the contrast between the marker areas 302-308 and the blade areas 402-408 is enhanced. This is beneficial for marking and detecting positions of the blade 300 in images captured by imaging sensors 120. More details will be discussed in the present disclosure with reference to method 500 in FIG. 5, method 700 in FIG. 7, and method 900 in FIG. 9.

Figure 5:
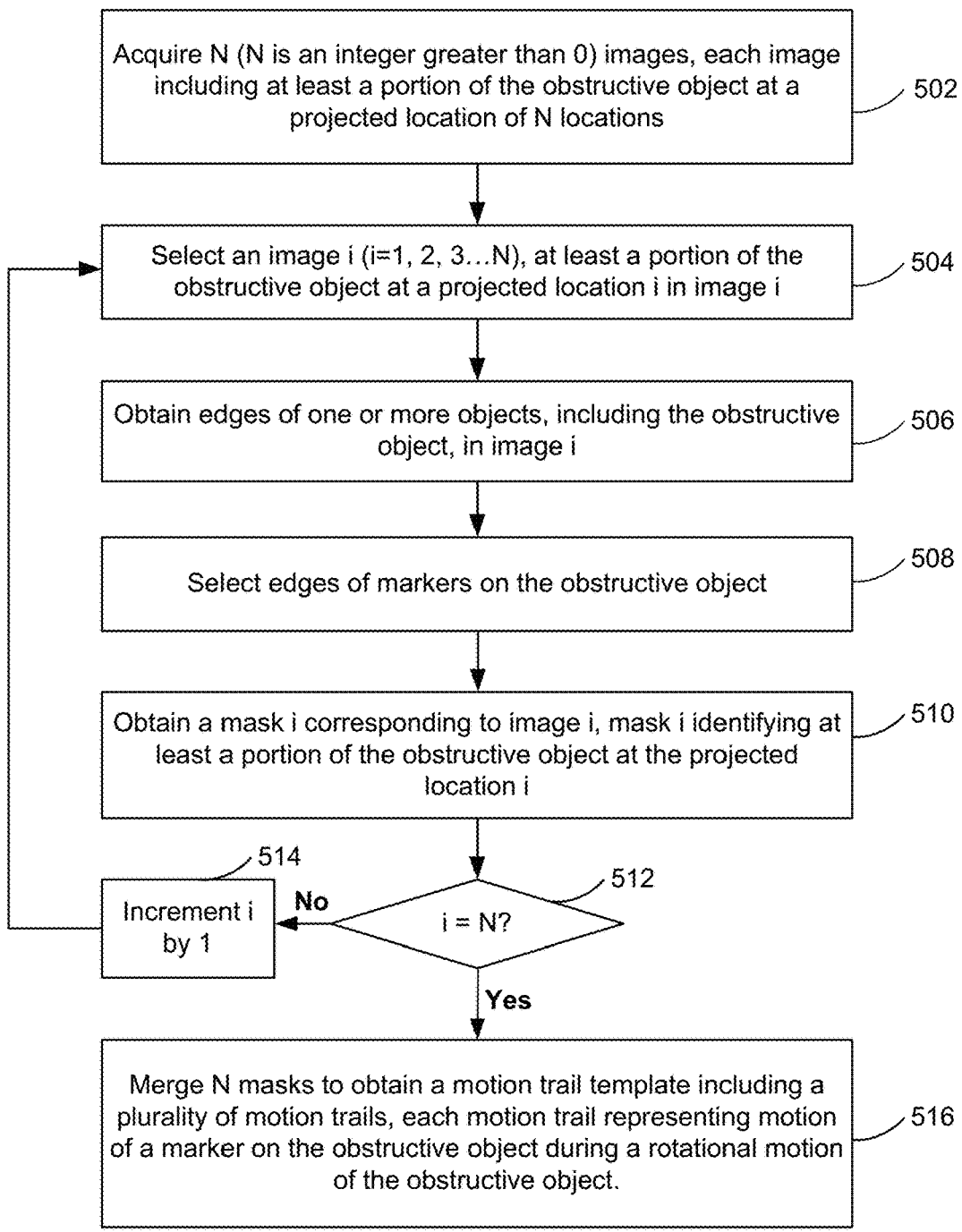
FIG. 5 is a flow diagram illustrating a method for preparing a motion trail template used for image processing, in accordance with some embodiments.
Figure 6:
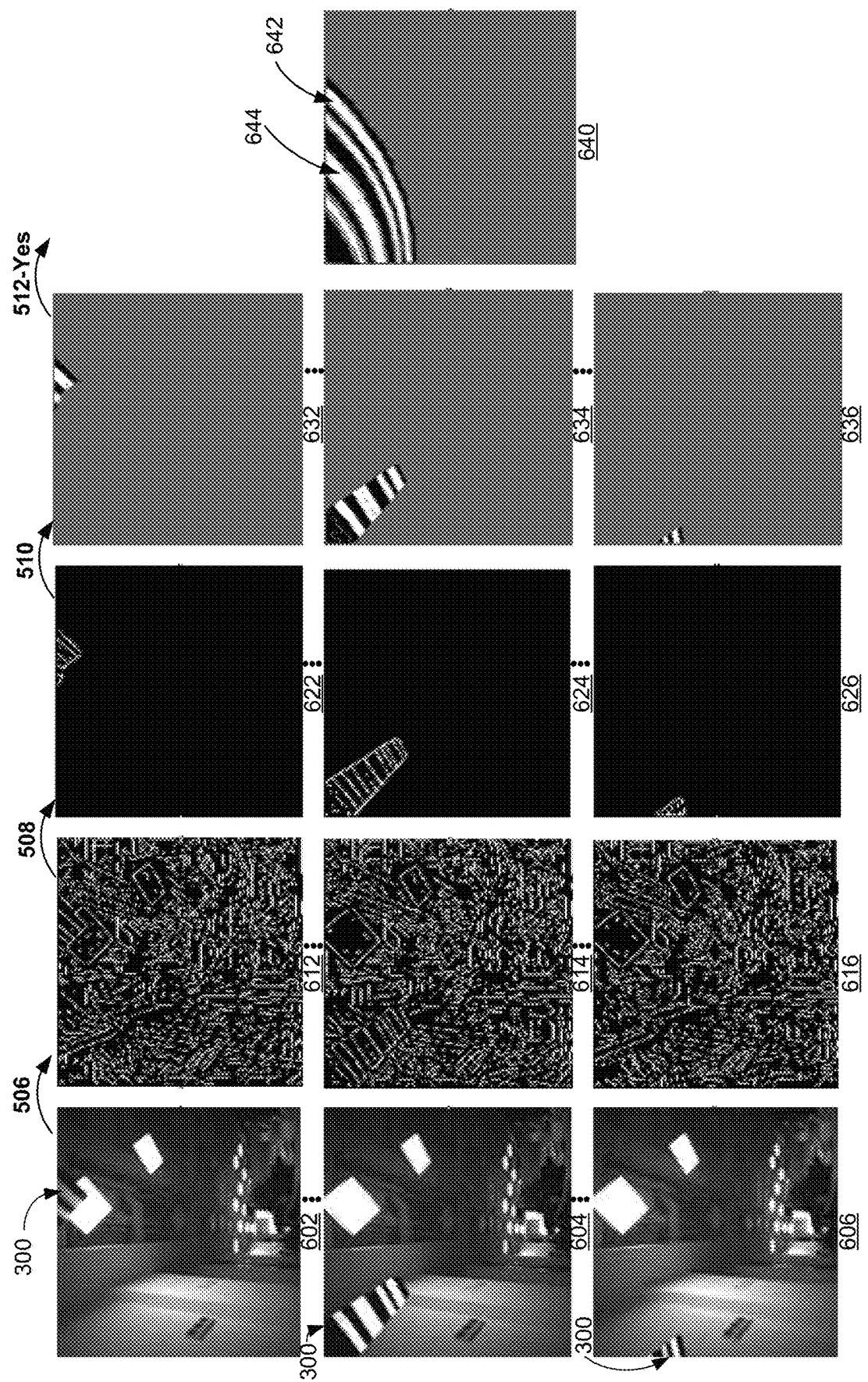
FIG. 6 illustrates an exemplary process of preparing a motion trail template for image processing, in accordance with some embodiments.

FIG. 5 is a flow diagram illustrating a method 500 for preparing a motion trail template used for image processing, in accordance with some embodiments. The motion trail template includes information indicating motion and locations of an obstructive object, e.g., the propeller blade 300 or a blocking surface of the propeller blade 300, during rotation of the obstructive object. In some embodiments, the method 500 is performed by an electronic device such as the computing device 110, the control unit 108, or the movable object 102 (FIG. 1). In some other embodiments, the method 500 is performed by other electronic device(s), such as a mobile device or a computing device paired with the control unit 108 for operating the movable object 102. Operations performed in FIG. 5 correspond to instructions stored in computer memories or other computer-readable storage mediums of the corresponding device(s). FIG. 6 illustrates an exemplary process of preparing a motion trail template 640 for image processing, in accordance with some embodiments. The images processed at one or more steps of method 500 are further illustrated in FIG. 6, which uses the propeller blade 300 as an example of the obstructive object, in accordance with some embodiments.

In some embodiments, the electronic device acquires (502) a plurality of images, such as images 602, 604, and 606 in FIG. 6. The plurality of images are captured by an imaging device, such as the imaging sensor(s) 120 or the imaging device 216 borne by the movable object 102. The plurality of images can be a series of image frames of a video captured at a periodic rate. In some embodiments, each image of the plurality of images is a short-exposure image, e.g., taken when the obstructive object moves relatively slowly or with a short exposure time. In some embodiments, each image of the plurality of images is a long-exposure image, e.g., taken when the obstructive object moves relatively fast or with a long exposure time. In some embodiments, each image of the plurality of images includes at least a portion of the obstructive object at one or more respective locations. For example, each image of images 602, 604, and 606 of FIG. 6 includes a portion of the blocking surface of the propeller blade 300 at different locations.

With regard to the process of preparing the motion trail template, the electronic device selects (504) a certain image, such as image 602 (FIG. 6), from the plurality of images. The selected image includes at least a portion of the obstructive object at a projected location. For example, image 602 includes a portion of the propeller blade 300 located at a certain location. The electronic device obtains (506) edges of one or more objects including the obstructive object in the selected image, e.g., image 602, as illustrated in image 612. In some embodiments, an edge detection algorithm, such as Canny edge detection algorithm, is used by the electronic device to extract edge information in image 602. One or more threshold values for the algorithm are selected for effectively identifying the edges with high contrast between the brighter marker area and the darker blade area (FIG. 4B).

In some embodiments, the electronic device selects (508), from the detected edges in image 602 in step 506, edges of the markers on the obstructive object and/or edges of the obstructive object. For example, the electronic device selects markers edges and/or the blade edges in image 602, as illustrated in image 622. Step 508 can be performed manually. Alternatively or additionally, step 508 can be performed automatically, e.g., by pattern recognition process using one or more pre-set criteria and/or pattern(s) for identifying the marker edges and blade edges. In some embodiments, one or more edges, including blade edges and marker edges, are selected to form one or more enclosed areas, as shown in image 622.

In some embodiments, the electronic device obtains (510) a mask, e.g., mask 632, which corresponds to the processed image at step 508, e.g., image 622. Mask 632 identifies at least a portion of the obstructive object, e.g., the blade 300, at a certain location. In some embodiments, mask 632 is formed by filling different colors in different types of regions. For example, the regions corresponding to markers on the blade in image 622 are filled with white color, the regions corresponding to the rest of the blade areas (e.g., the rest of the areas within the enclosed areas) are filled with black color, and the rest of the regions (e.g., uncertain regions) in image 622 are filled with gray color.

In some embodiments, method 500 proceeds to determine (512) whether the currently processed image, e.g., image 602, is the last image of the plurality of acquired images at step 502. In other words, it is determined (512) whether all images of the plurality of images acquired at step 502 have been processed. In accordance with a determination that the currently processed image is not the last image of the plurality of acquired images (512-No), the electronic device proceeds to process the next image of the plurality of images (514). For example as shown in FIG. 6, other images, e.g., images 604 and 606, include at least a portion of the obstructive object (the blade 300) at respective locations. The images 604 and 606 are processed using edge detection algorithms to detect (506) all the edges in the images (as shown in images 614 and 616 respectively), to select (508) the marker edges and/or blade edges (as shown in images 624 and 626 respectively), and to obtain (510) masks 634 and 636 by filling different colors in corresponding regions.

In accordance with a determination that the currently processed image is the last image of the plurality of acquired images (512-Yes), the electronic device merges (516) all masks from the plurality of images to obtain a motion trail template including a plurality of motion trails. Each motion trail represents a motion of a marker on the obstructive object during the rotational motion of the obstructive object. For example, the electronic device merges all masks, including masks 632, 634, and 636, to obtain a motion trail template 640. The motion trail template 640 includes a plurality of motion trails, such as the stripes in FIG. 6. In some embodiments, each motion trail (e.g., motion trail 642, motion trail 644) illustrates a trail of motion of a marker on the obstructive object during rotation of the obstructive object. For example, marker 302 (FIGS. 3 and 4B) corresponds to motion trail 642, marker 306 corresponds to motion trail 644 (FIGS. 3 and 4B).

In some embodiments, during the merging process at step 516, only the regions designated as marker regions in all masks are identified as marker regions. However, if a certain region in a first mask is designated as a marker region at step 510, and the same region in a second mask is designated as a blade region at step 510, then this particular region is not designated as a marker region in the motion trail template 640 at the merging step 512.

In some other embodiments, the regions designated as marker regions or uncertain regions (e.g., not a marker region or a blade region) in the plurality of masks can be identified as marker regions. For example, if a certain region in a first mask is designated as a marker region at step 510, and the same region in a second mask is designated as an uncertain region at step 510, then this particular region can be identified as a marker region in the motion trail template 640 at the merging step 512.

Similarly, in some embodiments, during the merging process at step 516, the regions designated as blade regions in all masks or the regions designated as blade regions or uncertain regions in all masks are identified as blade regions. For example, if a certain region in a first mask is designated as a blade region at step 510, and the same region in a second mask is designated as a marker region at step 510, then this particular region is not identified as a blade region in the motion trail template 640 at the merging step 512.

In some embodiments, a change of a shape or a change of a boundary of the markers, a gradient transition from a marker region to an obstructive object region (e.g., to a blade region), and/or a change to the illumination effect can cause errors or uncertainties to the edge detection process. Thus the motion trail template 640 is further optimized to eliminate errors to provide more accurate motion trail information which is related to the locations of the obstructive object. In some embodiments, the boundaries of the marker regions and the boundaries of the blade regions are adjusted inward to improve the matching degrees between the markers and the obstructive object in the template and the corresponding markers and the obstructive object in captured images for processing.

In some embodiments, the motion trail template 640 can also be prepared using a long-exposure image (not shown) captured by an imaging sensor (e.g., imaging sensor 120 or imaging device 216). Trails of one or more marks on the obstructive object moving from a first location to a second location can be shown in the long-exposure image. The captured long-exposure image can then be manually marked. For example, the trails corresponding to the motion of the markers are designated as marker regions in white color, and the trails corresponding to the motion of the blade are designated as blade regions in black color.

Figure 7:
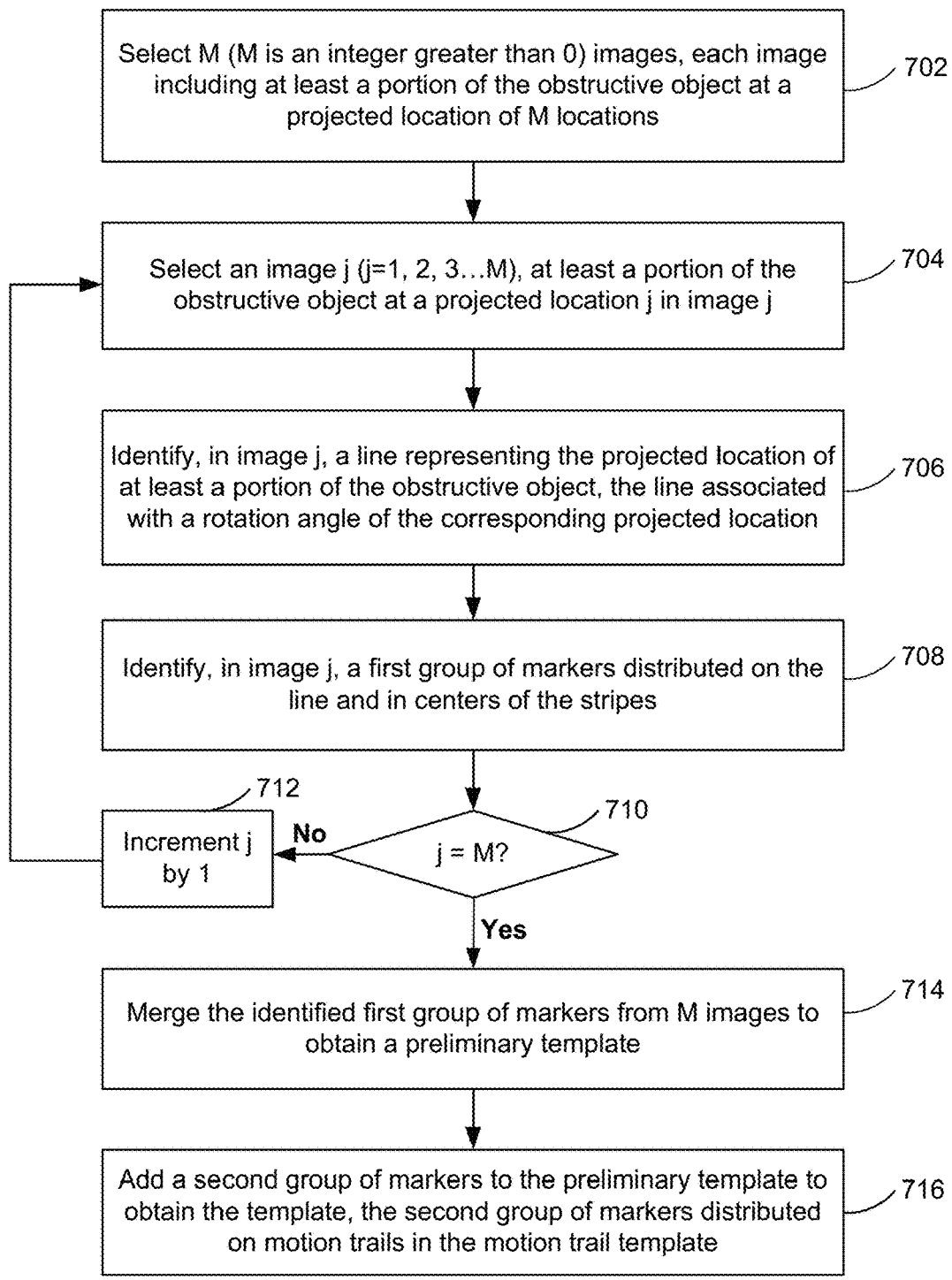
FIG. 7 is a flow diagram illustrating a method for preparing a template used for image processing, in accordance with some embodiments.

FIG. 7 is a flow diagram illustrating a method 700 for preparing a template used for image processing, in accordance with some embodiments. The template includes information indicating projected locations (e.g., possible locations) of an obstructive object, e.g., the propeller blade 300, within an image during rotation of the obstructive object. In some embodiments, when the imaging sensor (e.g., imaging sensor 120 or imaging device 216) is partially blocked by the obstructive object (e.g., the blade 300), and a relative location between the imaging sensor and the obstructive object is fixed (e.g., for the imaging sensor 120) or can be determined (e.g., for the imaging device 216 using position information of the imaging device 216), a template can be prepared to include information representing at least a portion of the blade 300 at one or more projected locations (possible locations) in an image captured by the imaging sensor. In some embodiments, the template includes one or more markers, such as dots, pixels, lines, or a polygon. In some embodiments, the template includes location information and/or pixel value of each marker.

Figure 8:
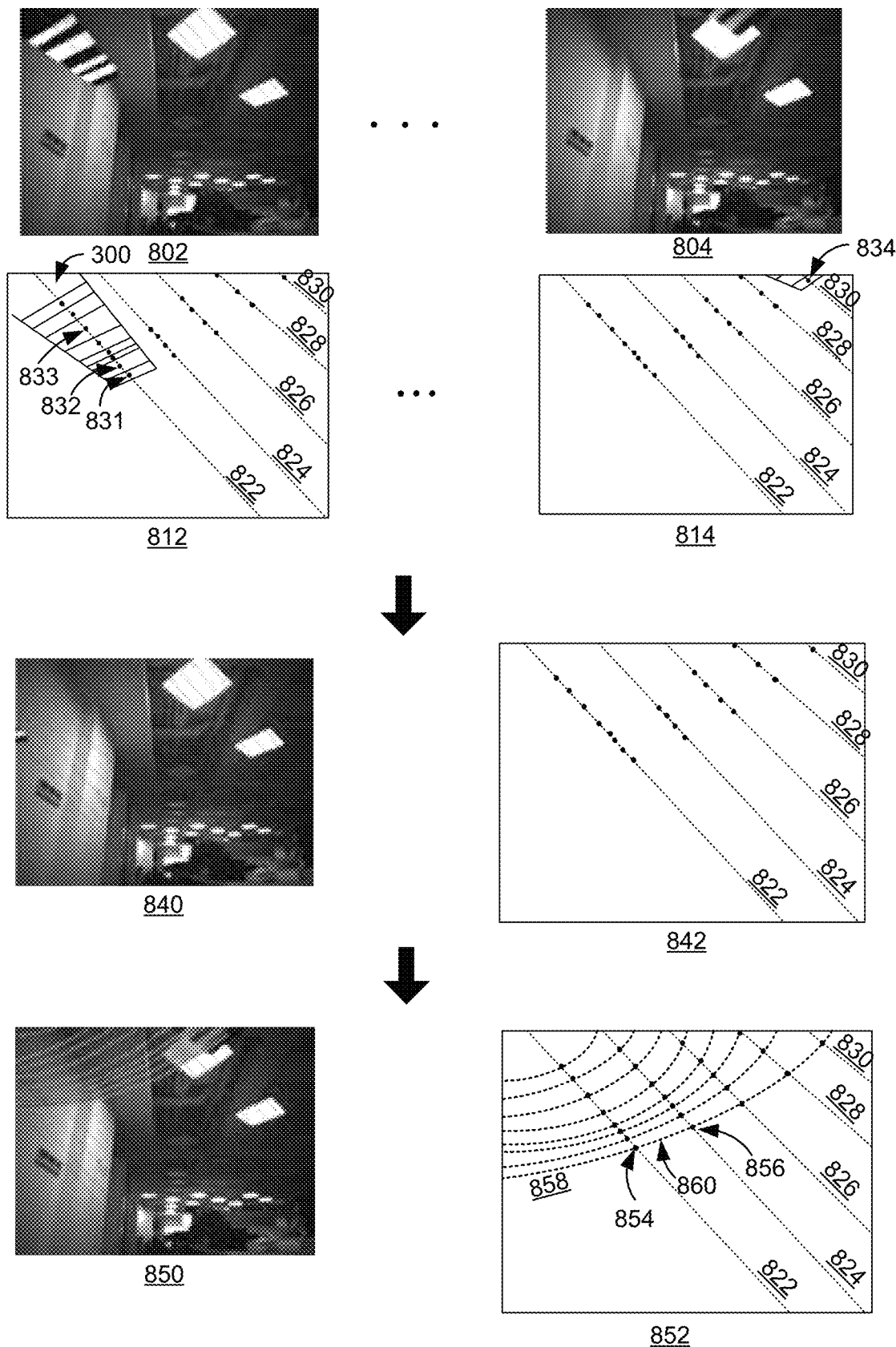
FIG. 8 illustrates an exemplary process of preparing a template for image processing, in accordance with some embodiments.

In some embodiments, the method 700 is performed by an electronic device such as the computing device 110, the control unit 108, or the movable object 102 (FIG. 1). In some other embodiments, the method 700 is performed by other electronic device(s), such as a mobile device or a computing device paired with the control unit 108 for operating the movable object 102. Operations performed in FIG. 7 correspond to instructions stored in computer memories or other computer-readable storage mediums of the corresponding device(s). FIG. 8 illustrates an exemplary process of preparing template 852 for image processing, in accordance with some embodiments. One or more steps of method 700 regarding processing the images to prepare the template are further illustrated in FIG. 8, which uses the propeller blade 300 as an example of the obstructive object, in accordance with some embodiments.

In some embodiments, the electronic device selects (702) a plurality of images, such as images 802 and 804 in FIG. 8. The plurality of images are captured by an imaging device, such as the imaging sensor(s) 120 or the imaging device 216 borne by the movable object 102. The plurality of images can be a series of image frames of a video captured at a periodic rate. In some embodiments, each image of the plurality of images is a short-exposure image taken when the obstructive object moves relatively slowly. In some embodiments, each image of the plurality of images includes at least a portion of the obstructive object, such as the propeller blade 300, at a respective location.

The electronic device then selects (704) a certain image, such as image 802, from the plurality of images for processing. The selected image includes at least a portion of the obstructive object at a certain location. For example, in image 802 or the corresponding illustrative sketch 812 includes a portion of the propeller blade 300 located at a certain location. The electronic device identifies (706) a collection of points or a line representing the location of the portion of the obstructive object in the currently processed image. The collection of points or the line is associated with a rotation angle of the corresponding location of the portion of the obstructive object. For example, as shown in FIG. 8, the electronic device identifies line 822 which represents the projected location of at least a portion of the blade 300, as illustrated in image 812. In some embodiments, the line 822 is associated with a rotation angle of the projected location. In some embodiments, the line 822 is a longitudinal axis of symmetry of the blade 300. In some embodiments, the identified collections of points, such as lines 822, 824, 826, 828, and 830, of the respective plurality of images are evenly distributed as illustrated in image 812.

In some embodiments, the electronic device identifies (708) a first group of markers in the selected image, such as image 802/812. The first group of markers, such as markers 831, 832, and 833, are identified to be distributed on line 822 and at centers of the marker regions (e.g., stripes) and blade regions on blade 300. In some embodiments, the first group of markers are pixels from captured image 802 that are located on line 822 and at centers of the marker regions and blade regions on blade 300. Each pixel has a pixel value including brightness information and/or color information of the corresponding pixel in captured image 802.

In some embodiments, method 700 proceeds to determine (710) whether the currently processed image, e.g., image 802, is the last image of the plurality of acquired images at step 702. In other words, it is determined (710) whether all images of the plurality of images acquired at step 702 have been processed. In accordance with a determination that the currently processed image is not the last image of the plurality of acquired images (710-No), the electronic device proceeds to process the next image of the plurality of images (712). For example as shown in FIG. 8, other images, e.g., image 804, include at least a portion of the obstructive object (the blade 300) at respective locations. The image 804 is processed by identifying the line 830 and the first group of markers (e.g., 834) in image 804, as shown in corresponding illustrative sketch 814. Other images (not shown) are also processed by identifying the respective lines (e.g., 824, 826, and 828) and the first group of markers in corresponding images.

In accordance with a determination that the currently processed image is the last image of the plurality of acquired images (710-Yes), the electronic device merges (714) the identified first group of markers from the plurality of images to obtain a preliminary template 842 (corresponding to image 840). The preliminary template 842 includes a plurality of collections of points, such as lines 822, 824, 826, 828, and 830, indicating projected locations of the blade 300 during rotation and first group of markers distributed on respective lines.

In some embodiments, the electronic device further adds (716) a second group of markers to the preliminary template 842 to obtain the template 852 (corresponding to image 850). In some embodiments, the second group of markers are distributed on one or more trails (e.g., trail 858, FIG. 8) in motion trail template 640 (FIG. 6) obtained using method 500 (FIG. 5). In some embodiments, a plurality of markers in the second group of markers are added on motion trail 858 and between markers from the first group of markers, such as between marker 854 on line 822 and marker 856 on line 824. In some embodiments, the total number of markers in the second group of markers added on each motion trail, such as motion trail 858, is in a range from 200 to 400. The template 852 includes the first group of markers (identified at step 708) and the second group of markers (added at step 716). In some embodiments, one or more markers of the first group and the second group of markers in template 852 are corresponding pixels from respective capture images (e.g., image 802, image 804, etc.). Each pixel has a pixel value including brightness information and/or color information of the pixel in the corresponding captured image.

Figure 9:
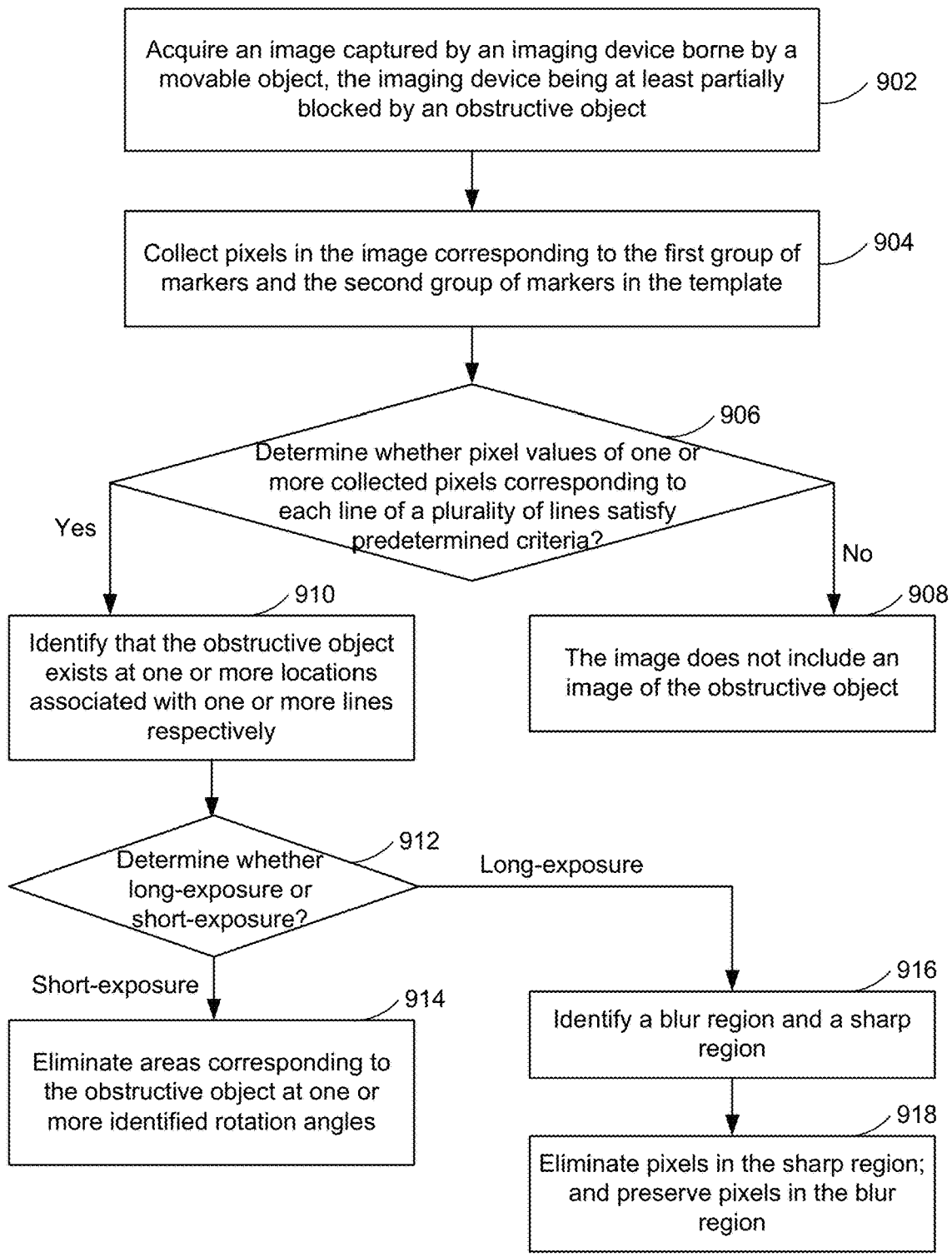
FIG. 9 is a flow diagram illustrating a method for supporting image processing for a movable object, in accordance with some embodiments.
Figure 10C:
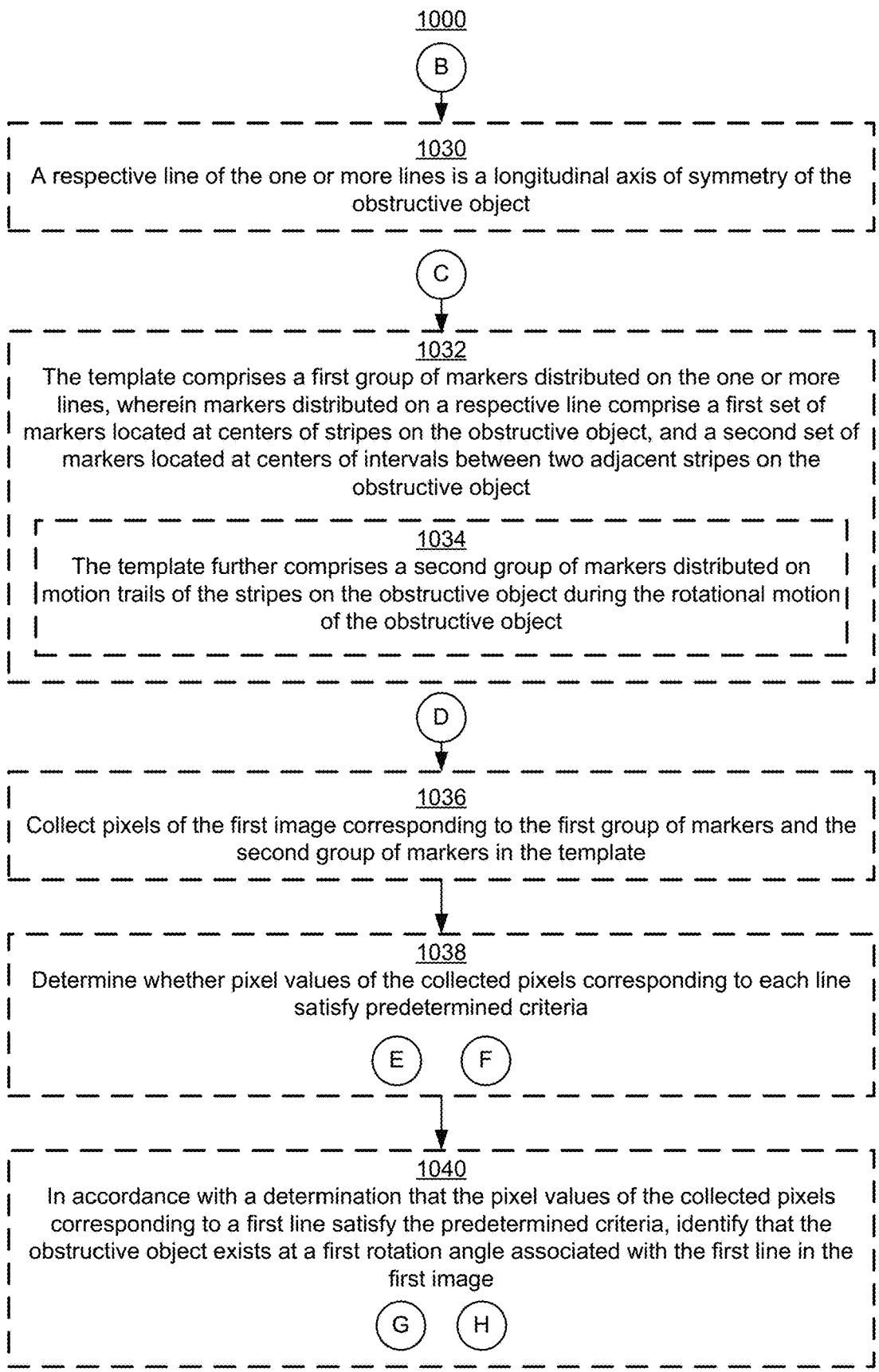
Figure 10D:
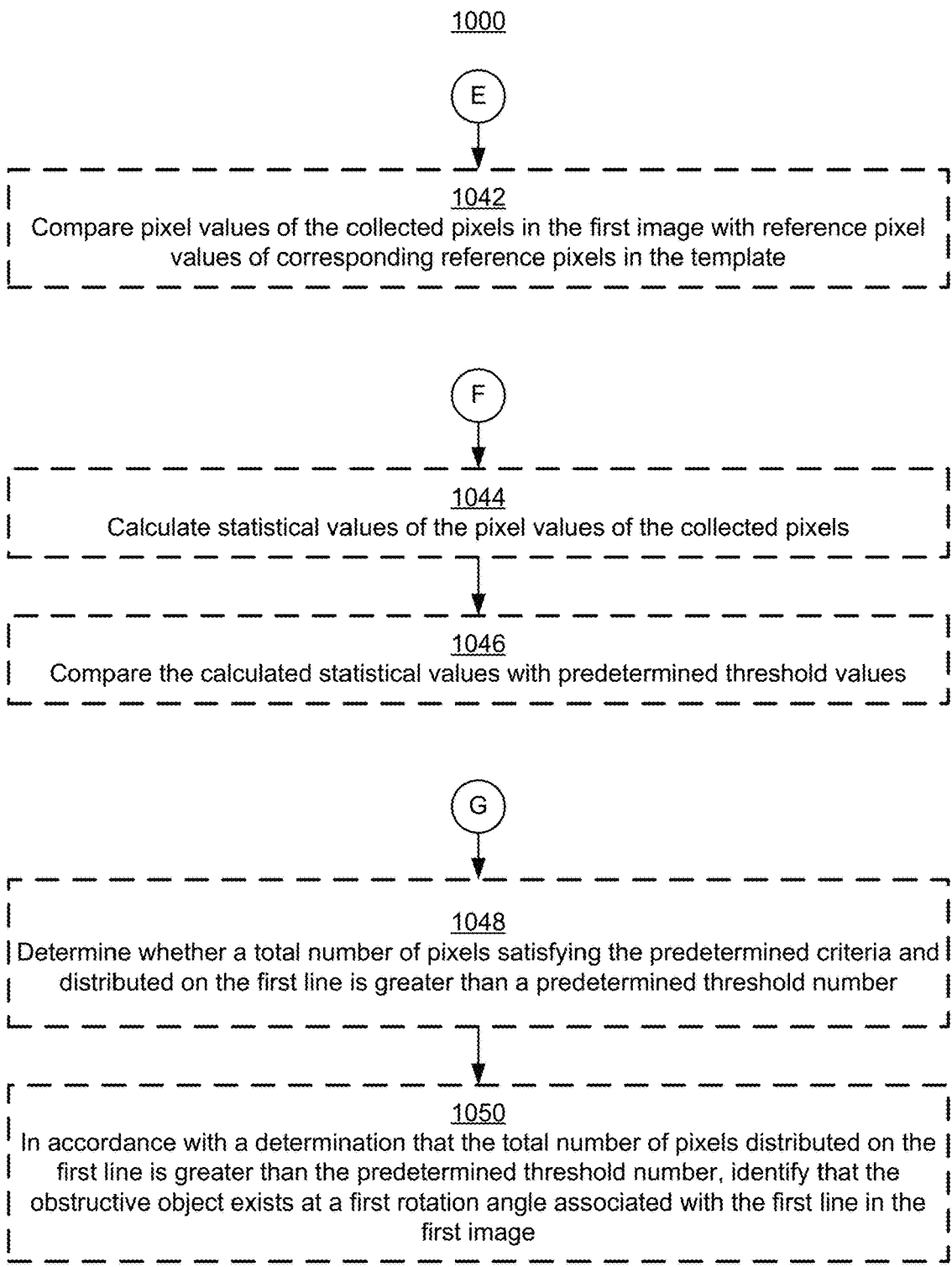
Figure 10E:
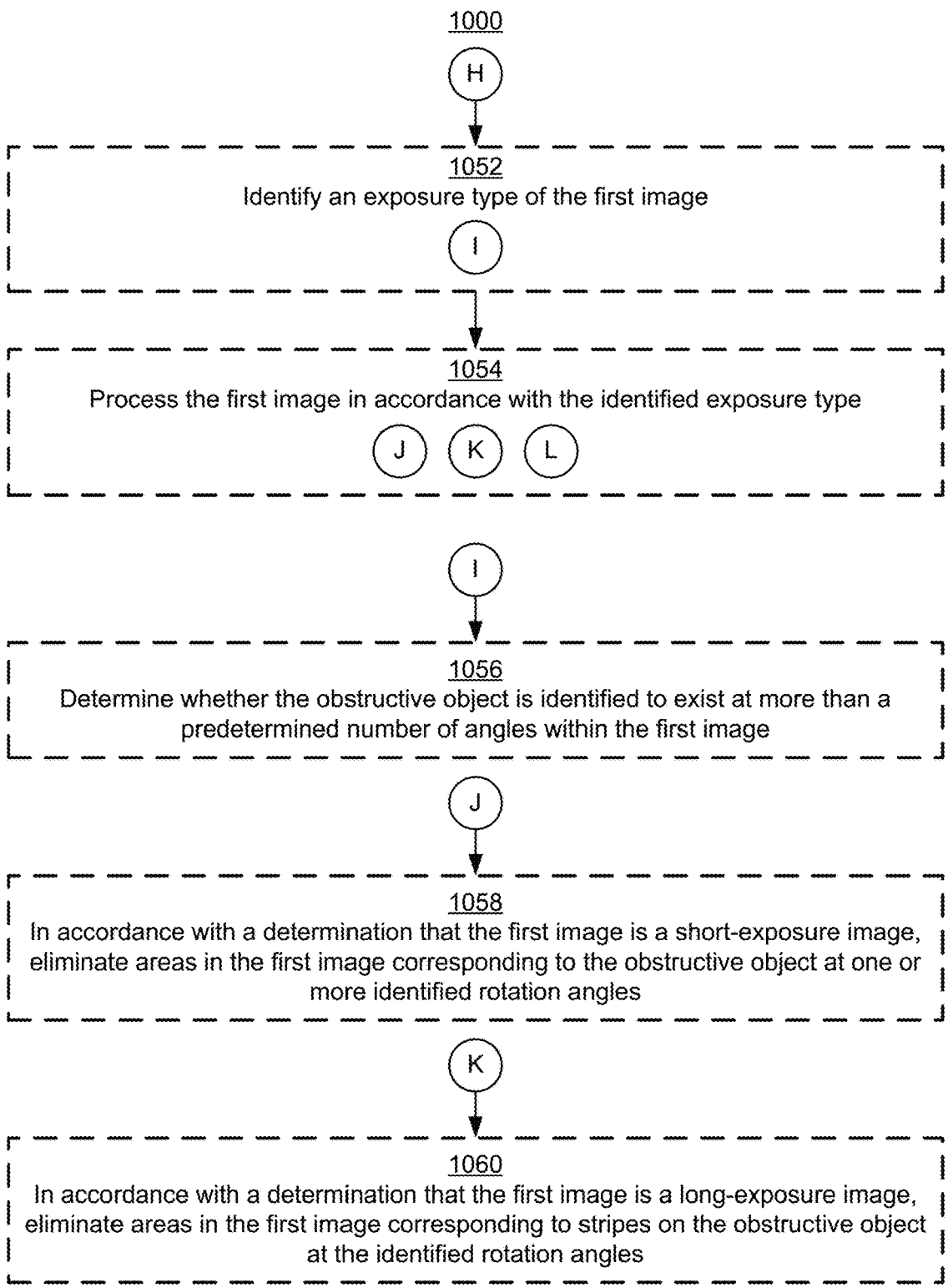
Figure 10F:
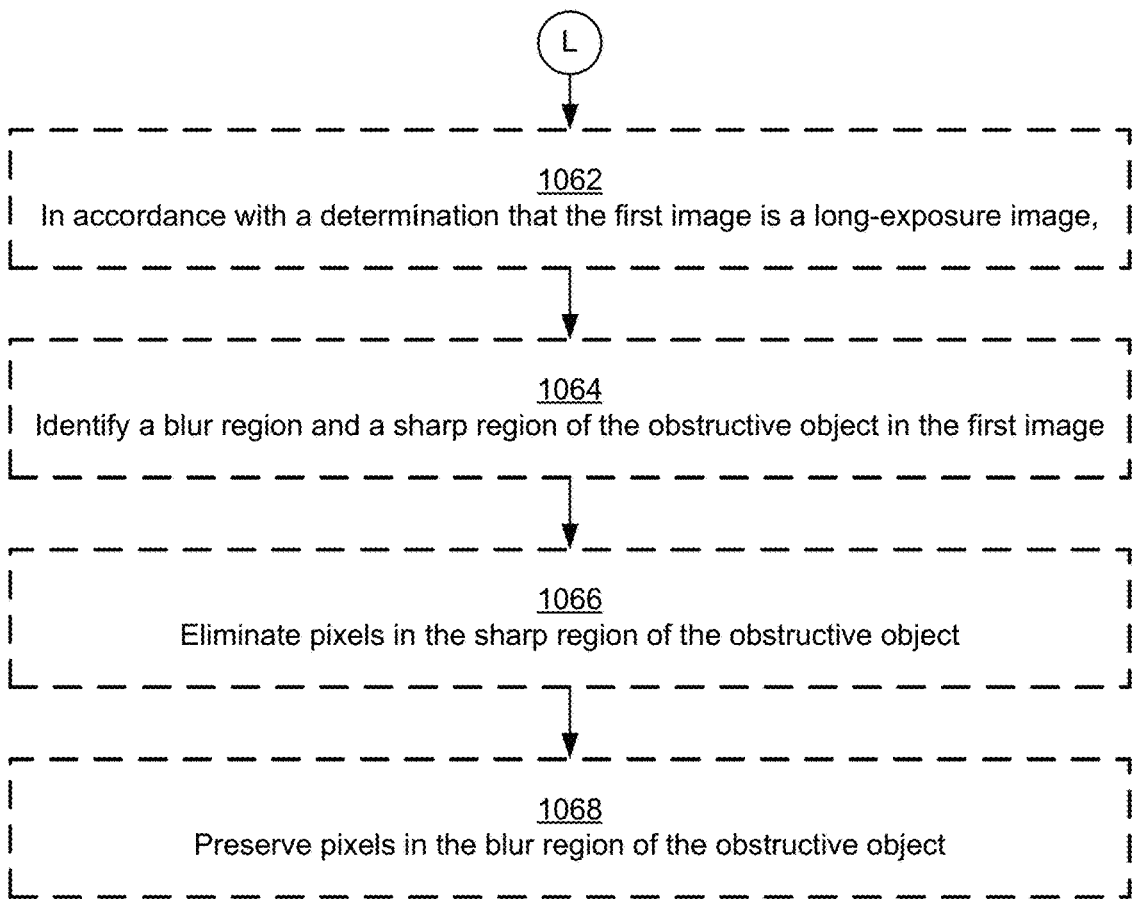

FIG. 9 is a flow diagram illustrating a method 900 for supporting image processing for movable object 102, in accordance with some embodiments. In some embodiments, the method 900 is performed by an electronic device such as the computing device 110, the control unit 108, or the movable object 102 (FIG. 1). In some other embodiments, the method 900 is performed by other electronic device(s), such as a mobile device or a computing device paired with the control unit 108 for operating the movable object 102. Operations performed in FIG. 9 correspond to instructions stored in computer memories or other computer-readable storage mediums of the corresponding device(s).

In some embodiments, the electronic device acquires (902) an image captured by an imaging device (e.g., imaging sensor 120 or imaging device 216) borne by the movable object 102. In some embodiments, the imaging device is at least partially blocked by a blocking surface of an obstructive object, such as propeller blade 300 of FIG. 3. The obstructive object can have a fixed configuration, a periodic configuration, or otherwise a predictable configuration relative to the imaging device. As a result, the image includes at least a portion of the obstructive object at a certain location. In some embodiments, a relative position between the imaging device and the obstructive object, such as between the imaging sensor 120 and the propeller blade 300, is fixed. In some embodiments, a relative position between the imaging device and the obstructive object, such as between the imaging device 216 and the propeller blade 300, can be determined or predicted. For example, position information of the imaging device 216 can be obtained from the carrier 104 to determine the relative position between the imaging device 216 and the propeller blade 300 when the imaging device captures the image. In some embodiments, the captured image is transmitted from the imaging device to the remote unit 108 or the computing device 110 for processing. In some embodiments, method 900 is performed in real time as the movable object 102 moves and captures images.

In some embodiments, the electronic device collects (904) pixels in the acquired image corresponding to the markers, including the first group and second group of markers, in template 852 of FIG. 8. The electronic device then determines (906) whether pixel values of one or more collected pixels corresponding to the first group of markers on each line of a plurality of lines in template 852 satisfy predetermined criteria.

In some embodiments, the electronic device selects pixels in the acquired image corresponding to the first group of pixels located one each line of the plurality of lines (e.g., 822, 824, 826, 828, and 830) in template 852 of FIG. 8, and compares the selected pixel values with the corresponding pixel values in the template 852. When difference(s) between the selected pixel values and pixel values of markers on a certain line in the template 852 is within a predetermined threshold, it is determined that at least a portion of the obstructive object is located on the certain line in the acquired image. Otherwise, it is determined that the obstructive object is not located on this line in the acquired image.

In some embodiments, when the difference(s) between the selected pixel values and pixel values of at least ⅓ of all markers on a certain line in the template 852 is within a predetermined threshold, it is determined that at least a portion of the obstructive object is located on the certain line in the acquired image.

In some embodiments at step 906, the electronic device first selects pixels from the acquired image that corresponds to the first group of markers on the plurality of lines in template 852. For each selected pixel, the electronic device then selects one or more neighboring pixels located in a neighboring region, such as a neighboring square or a neighboring circle, with the selected pixel as the center, the selected pixels in the neighboring region are located on one or more trails in the motion trail template 640 of FIG. 6. For example, the electronic device selects pixels located on one or more trails and in a neighboring square region of 21×21 pixels. In some embodiments, the electronic device calculates one or more statistical values for each pixel on the lines using the neighboring pixels. For example, the electronic device calculates a mean value of pixels located in the marker regions (bright_mean), a mean value of pixels located in the blade regions (dark_mean), a variation value of the pixels located in the marker regions (bright_var) (such as a standard deviation, an average absolute deviation, a median absolute deviation, or a maximum absolute deviation), and/or a variation value of the pixels located in the blade regions (dark_var). In some embodiments, the one or more calculated statistical values are compared to one or more corresponding predetermined threshold values. In an example, for a particular selected pixel on a certain line, when the bright_mean value is greater than a predetermined threshold value of 10, the dark_mean value is less than a predetermined threshold value of 50, the bright_var value is less than a predetermined threshold value of 70, and the dark_var value is less than a predetermined threshold value of 70, it is determined that this particular selected pixel exists on the obstructive object (e.g., blade 300) in the acquired image. In some embodiments, when at least ⅓ of the pixels on a certain line have statistical values satisfying the respective threshold values, it is determined that the obstructive object (e.g., blade 300) is located at a location corresponding to this line in the acquired image.

In accordance with a determination that the pixel values of one or more collected pixels corresponding to the first group of markers on any line of a plurality of lines in template 852 do not satisfy the predetermined criteria as discussed above (906-No), the electronic device determines (908) the acquired image does not include an image of the obstructive object, e.g., the blade 300, in the acquired image.

In accordance with a determination that the pixel values of one or more collected pixels corresponding to the first group of markers on one or more lines in template 852 satisfy the predetermined criteria as discussed above (906-Yes), the electronic device identifies (910) that at least portion of the obstructive object, e.g., the blade 300, appears in one or more locations corresponding to the one or more lines respectively within the acquired image.

In some embodiments, the electronic device further determines (912) whether the acquired image is a long-exposure image or a short-exposure image. In some embodiments, the electronic device determines whether at least a portion of the obstructive object, e.g., blade 300, covers a predetermined area in template 852. For example, the electronic device determines whether a portion of the obstructive object covers at least ⅔ of all lines in template 852. When the electronic device determines, from results of step 906, that a portion of the blade 300 exists on less than ⅔ of all lines within the acquired image, the electronic device determines that the acquired image is a short-exposure image (912-Short-exposure). In some embodiments, the electronic device eliminates (914) areas corresponding to the obstructive object at one or more identified rotation angles. For example, the portion of the blade 300 determined to locate at the one or more lines at step 906 are eliminated, such that the portion of the blade 300 is not mistaken as an obstacle or a target in the movable object environment.

When the electronic device determines, from results of step 906, that portion of the blade 300 exist on no less than ⅔ of all lines within the acquired image, the electronic device determines that the acquired image is a long-exposure image (912-Long-exposure). Motion blur of the blade 300 may occur in a long-exposure image. Some identified blade regions in the long-exposure image may not block an object (e.g., an obstacle or a target) in the movable object environment. As such, there is no need to eliminate all the image information corresponding to the identified blade regions.

In some embodiments, the electronic device identifies (916) a blur region and a sharp region in the long-exposure image using any suitable image processing technique(s). In some embodiments, the electronic device eliminates (918) pixels in the identified sharp region, and preserves (918) pixels in the identified blur region. In some alternative embodiments, the electronic device eliminates pixels corresponding to the markers (stripes) on the obstructive object, e.g., stripes on blade 300, and preserves the rest of the pixels in the acquired long-exposure image for further imaging processing.

In some embodiments, other methods, including using machine learning, can be used for performing image processing alternative to or in combination with the methods discussed above. For example, a plurality of images including obstructive objects at one or more projected locations are first manually and/or automatically marked. The marked images are fed to an algorithm for training the machine learning model. The trained model can be used for detecting the obstructive objects in an incoming captured image.

FIGS. 10A-10F are a flow diagram illustrating a method 1000 for supporting image processing for movable object 102, in accordance with some embodiments. The method 1000 is performed at a device, such as the movable object 102, the imaging sensor 120, the image device 216, the control unit 108, and/or the computing device 110. In some embodiments, the obstructive object includes propeller 300 (e.g., a propeller blade) of the movable object, an arm of the movable object, a landing gear of the movable object, or any other component of the movable object that may partially or completely block the imaging sensor 120 and/or the imaging device 216.

The device acquires (1002) one or more images. The one or more images are captured by an imaging device (e.g., the imaging sensor 120 or the imaging device 216) borne by the movable object 102. The imaging device is at least partially blocked by an obstructive object (or a blocking surface of the obstructive object), such as the propeller blade 300, attached to the movable object 102. In some embodiments, the imaging device, such as the imaging sensor 120, is (1008) fixedly mounted on the movable object 102, thus a relative position between the imaging sensor 120 and the propeller blade 300 rotated to a certain location is fixed. In some alternatively embodiments, the imaging device, such as the imaging device 216, is borne by the carrier 104 and the position information of the imaging device 216 can be determined using one or more sensors attached to the carrier 104.

In some embodiments, the obstructive object includes (1010) at least a portion of the blade 300 of a propeller system for providing a motion of the movable object 102. In some embodiments, the obstructive object includes (1012) a plurality of markers (e.g., stripes 302, 304, 306, and 308, FIG. 3) distributed on a blocking surface, e.g., a lower surface, of the obstructive object facing the imaging device of the movable object 102. In some embodiments, each marker of the plurality of markers is (1014) made of a reflective material. In some embodiments, the movable object 102 includes an illumination source configured to illuminate (1016) the one or more reflective markers on the blade 300, as illustrated in FIG. 4B.

In some embodiments as illustrated in FIG. 3, each marker is (1018) an arc stripe on a respective concentric circle of a plurality of concentric circles. The plurality of concentric circles have a common central axis around which the blade 300 is configured to rotate. In some embodiments, the plurality of markers includes (1020) multiple groups of stripes with different widths. For example, each stripe of a first group of stripes (e.g., 304, 308, FIG. 3) has a first width, and each stripe in a second group of stripes (e.g., 302, 306, FIG. 3) has a second width that is 1.5-2.5 times the first width. In some embodiments, the multiple groups of strips are alternatingly distributed near an outer edge of the blade 300 as shown in FIG. 3. In some embodiments, each group of stripes includes (1022) 3 to 5 stripes.

The device applies (1004) a template (e.g., the template 852 determined using methods 500 and 700) to the one or more acquired images to obtain one or more projected locations of the obstructive object, e.g., propeller blade 300, within the one or more acquired images. In some embodiments, the template 852 includes (1024) a pattern representing one or more projected locations of at least portion of the obstructive object (e.g., propeller blade 300) during a rotational motion of the obstructive object. For example, the template 852 (FIG. 8) includes (1026) one or more collections of points, such as lines (e.g., lines 822, 824, 826, 828, and 830, FIG. 8) respectively representing the one or more projected locations of the obstructive object (e.g., the propeller blade 300) during the rotational motion. In some embodiments, each line is associated with a rotation angle of a corresponding projected location. In some other embodiments, the template 852 includes other markers, such as dots or polygons, to represent the one or more projected locations of the obstructive object.

In some embodiments, a respective line of the one or more lines in the template 852 (FIG. 8) is (1030) a longitudinal axis of symmetry of the blocking surface of the obstructive object, such as the propeller blade 300. In some embodiments, the template 852 includes (1032) a first group of markers (e.g., markers 831, 832, 833, image 812, FIG. 8) distributed on the one or more lines (e.g., line 822, image 812, FIG. 8). In some embodiments, the markers distributed on a respective line, e.g., line 822, comprise (1032) a first set of markers located at centers of stripes on the propeller blade 300, such as markers 832 and 833. The markers distributed on line 822 also includes (1032) a second set of markers located at centers of intervals between two adjacent stripes, i.e., blade regions, on the propeller blade 300, such as marker 831.

In some embodiments, the template 852 further includes (1034) a second group of markers (e.g., marker 860 in FIG. 8) distributed on trails (e.g., trail 858, FIG. 8) from the motion trail template 640 (FIG. 6). The motion trail template 640 includes trails indicating motion of the stripes on the propeller blade 300 during the rotational motion of the propeller blade 300. In some embodiments, the number of markers in the second group of markers on each trail is in a range between 200 to 400.

The device detects (1006) at least portion of the blocking surface of the obstructive object (e.g., the propeller blade 300) at the one or more projected locations within the one or more images acquired at step 1002. In some embodiments, the device determines (1028) whether at least portion of the propeller blade 300 are located on the one or more lines (e.g., lines 822, 824, 826, 828, and 830, FIG. 8) in a certain image.

In some embodiments, the device collects (1036) pixels in a certain acquired image corresponding to the first group of markers and the second group of markers in the template 852. By using the template 852, only the pixels in the acquired image that correspond to the first group and the second group of markers are to be considered. This can reduce computing workload of the device and improve efficiency for image processing, as there is no need to examine each pixel in the acquired image.

The device determines (1038) whether pixel values of the collected pixels corresponding to the first group of markers on each line satisfy predetermined criteria. For example, the device compares (1042) the pixel values of the collected pixels in the acquired image with the pixel values (e.g., reference pixel values) of corresponding pixels (e.g., reference pixels) obtained from images for making the template 852. The device compares the difference with a predetermined threshold value.

In some embodiments, for each pixel on a certain line, a plurality of neighboring pixels and corresponding to the second group of markers in template 852 are identified. The device calculates (1044) one or more statistical values of the pixel values of the collected pixels. For example, the device calculates one or more statistical values based on those neighboring pixels for each pixel on the line. For example, for a particular pixel on a certain line, a mean value for all neighboring pixels in the stripe regions (e.g., with brighter color), a mean value for all neighboring pixels in the blade regions (e.g., with darker color), a deviation value for all neighboring pixels in the stripe regions, and a deviation value for all neighboring pixels in the blade regions are calculated. The device compares (1046) the one or more statistical values with one or more predetermined threshold values (as discussed in method 900 with reference to FIG. 9).

In accordance with a determination that the pixel values of the collected pixels corresponding to a first line satisfy the predetermined criteria, the device identifies (1040) that the obstructive object (e.g., the propeller blade 300) exists at a first rotation angle associated with the first line in the acquired image being processed.

In some embodiments, the device further determines (1048) whether a total number of pixels satisfying the predetermined criteria and distributed on the first line is greater than a predetermined threshold number. For example, it is determines whether more than ⅓ of all pixels on the first line satisfy the predetermined criteria. In accordance with a determination that the total number of pixels distributed on the first line is greater than the predetermined threshold number, the device identifies (1050) that the propeller blade 300 exists at a first rotation angle associated with the first line in the first image.

In some embodiments, the device further identifies (1052) an exposure type of the acquired first image. For example, the device determines (1056) whether the blocking surface of the obstructive object (e.g., the propeller blade 300) is identified to exist at more than a predetermined number of angles (corresponding to the lines) within the first image. In an example, the device determines whether at least portion of the propeller blade 300 is identified to exist at no less than ⅔ of all lines within the first image. The device then processes (1054) the first image in accordance with the identified exposure type.

When at least portion of the propeller blade 300 is identified to exist at less than ⅔ of all lines within the first image, the first image is identified to be short-exposure image. In accordance with a determination that the first image is a short-exposure image, the device eliminates (1058) areas in the first image corresponding to the propeller blade 300 at one or more identified rotation angles (corresponding lines).

When at least portion of the propeller blade 300 is identified to exist at no less than ⅔ of all lines within the first image, the first image is identified to be long-exposure image. In accordance with a determination that the first image is a long-exposure image, the device eliminates (1060) areas in the first image corresponding to stripes on the propeller blade 300 at the identified rotation angles (corresponding lines).

In some embodiments, in accordance with a determination that the first image is a long-exposure image (1062), the device further identifies (1064) a blur region and a sharp region of the propeller blade 300 in the first image. The device then eliminates (1066) pixels in the identified sharp region of the propeller blade 300. The device preserves (1068) pixels in the identified blur region of the propeller blade 300.

Figure 11C:
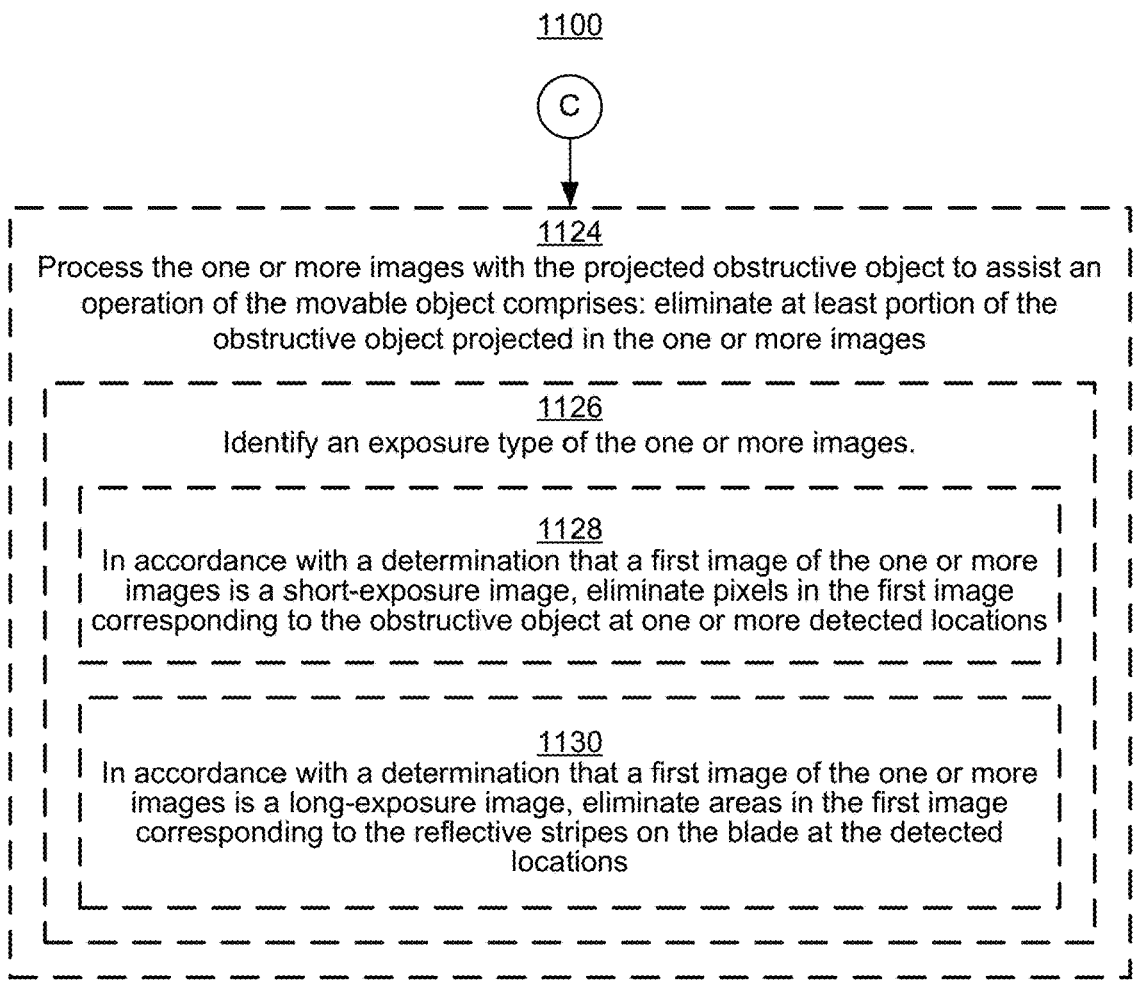

FIGS. 11A-11C are a flow diagram illustrating a method 1100 for controlling movable object 102, in accordance with some embodiments. The method 1100 is performed at a device, such as the movable object 102, the imaging sensor 120, the image device 216, the control unit 108, and/or the computing device 110.

The device acquires (1102) one or more images. The one or more images are captured by an imaging device (e.g., the imaging sensor 120 or the imaging device 216) borne by the movable object 102. The imaging device is at least partially blocked by an obstructive object, such as the propeller blade 300, attached to the movable object 102. In some embodiments, the obstructive object includes (1108) at least a portion of the blade 300 of a propeller system for providing a motion of the movable object 102. In some embodiments, the blade 300 includes (1110) a plurality of reflective stripes, (e.g., stripes 302, 304, 306, and 308, FIG. 3) distributed on a lower surface of the blade 300 facing the imaging device of the movable object 102. In some embodiments, the movable object 102 includes an illumination source configured to illuminate the one or more reflective stripes on the blade 300, as illustrated in FIG. 4B.

The device detects (1104) at least portion of the obstructive object (e.g., the propeller blade 300) projected in the acquired one or more images. In some embodiments, the device applies (1112) a template (e.g., template 852, FIG. 8) to the one or more images to obtain one or more projected locations of the propeller blade 300 within the acquired one or more images. In some embodiments, the template includes (1114) one or more lines (e.g., lines 822, 824, 826, 828, and 830, FIG. 8) respectively representing the one or more projected locations of the propeller blade 300 during a rotational motion. Each line is associated with a rotation angle of a corresponding projected location. In some embodiments, the template includes (1116) a first group of markers (e.g., markers 831, 832, and 833 of image 812, FIG. 8) distributed on the one or more lines (e.g., line 822, image 812, FIG. 8). The template further includes (1116) and a second group of markers (e.g., marker 860, image 852, FIG. 8) distributed on motion trails (e.g., trail 858, FIG. 8) obtained from the motion trail template 640 (FIG. 6). The motion trail template 640 includes a plurality of trails (e.g., trail 642, 644, FIG. 6) corresponding to motion trails of reflective stripes on the blade 300 during the rotational motion of the blade 300.

The device processes (1106) the acquired one or more images with the projected obstructive object (e.g., propeller blade 300) to assist an operation of the movable object 102. In some embodiments, the operation of the movable object 102 includes, but is not limited to, obstacle avoidance, navigation and orientation, image capturing and processing, and/or target tracking.

In some embodiments, the device collects (1118) pixels in a certain acquired image (e.g., a first image) corresponding to the first group of markers and the second group of markers in the template 852. The device then determines (1120) whether pixel values of the collected pixels corresponding to the first group of markers on each line satisfy predetermined criteria. For example, the device compares the pixel values of the collected pixels in the acquired image with the pixel values of corresponding pixels obtained from images for making the template 852. The device compares the difference with a predetermined threshold value. In another example, for each pixel on a certain line, a plurality of neighboring pixels and corresponding to the second group of markers in template 852 are identified. The device calculates one or more statistical values of the pixel values of the collected pixels and compares the one or more statistical values with one or more predetermined threshold values (as discussed in method 900 with reference to FIG. 9).

In accordance with a determination that the pixel values of the collected pixels corresponding to a first line satisfy the predetermined criteria, the device identifies (1122) that the obstructive object (e.g., the propeller blade 300) exists at a first rotation angle associated with the first line in the first image.

In some embodiments, processing (e.g., 1106) the one or more images with the projected obstructive object to assist an operation of the movable object comprises (1124) eliminating at least portion of the obstructive object (e.g., propeller blade 300) projected in the one or more images. In some embodiments, the device identifies (1126) an exposure type of the acquired first image. For example, the device determines whether the propeller blade 300 is identified to exist at more than a predetermined number of angles (corresponding to the lines) within the first image. In an example, the device determines whether at least portion of the propeller blade 300 is identified to exist at no less than ⅔ of all lines within the first image. In some embodiments, when at least portion of the propeller blade 300 is identified to exist at less than ⅔ of all lines within the first image, the first image is identified to be short-exposure image. On the other hand, when at least portion of the propeller blade 300 is identified to exist at no less than ⅔ of all lines within the first image, the first image is identified to be long-exposure image.

In some embodiments, in accordance with a determination that the first image of the one or more images is a short-exposure image, the device eliminates (1128) pixels in the first image corresponding to the propeller blade 300 at one or more detected locations.

In accordance with a determination that the first image is a long-exposure image, the device eliminates (1130) areas in the first image corresponding to the reflective stripes on the propeller blade 300 at the detected locations.

In some embodiments, with regard to a long-exposure image, the device further identifies one or more blur regions and one or more sharp regions of the propeller blade 300 in the first image. The device then eliminates pixels in the identified sharp regions of the propeller blade 300. The device preserves pixels in the identified blur regions of the propeller blade 300.

Many features of the present disclosure can be performed in, using, or with the assistance of hardware, software, firmware, or combinations thereof. Consequently, features of the present disclosure may be implemented using a processing system. Exemplary processing systems (e.g., processor(s) 202) include, without limitation, one or more general purpose microprocessors (for example, single or multi-core processors), application-specific integrated circuits, application-specific instruction-set processors, field-programmable gate arrays, graphics processors, physics processors, digital signal processors, coprocessors, network processors, audio processors, encryption processors, and the like.

Features of the present disclosure can be implemented in, using, or with the assistance of a computer program product, such as a storage medium (media) or computer readable storage medium (media) having instructions stored thereon/in which can be used to program a processing system to perform any of the features presented herein. The storage medium (e.g., the memory 204) can include, but is not limited to, any type of disk including floppy disks, optical discs, DVD, CD-ROMs, microdrive, and magneto-optical disks, ROMs, RAMs, EPROMs, EEPROMs, DRAMs, VRAMs, DDR RAMs, flash memory devices, magnetic or optical cards, nanosystems (including molecular memory ICs), or any type of media or device suitable for storing instructions and/or data.

Stored on any one of the machine readable medium (media), features of the present disclosure can be incorporated in software and/or firmware for controlling the hardware of a processing system, and for enabling a processing system to interact with other mechanism utilizing the results of the present disclosure. Such software or firmware may include, but is not limited to, application code, device drivers, operating systems, and execution environments/containers.

Communication systems as referred to herein (e.g., the communication system 206) optionally communicate via wired and/or wireless communication connections. For example, communication systems optionally receive and send RF signals, also called electromagnetic signals. RF circuitry of the communication systems convert electrical signals to/from electromagnetic signals and communicate with communications networks and other communications devices via the electromagnetic signals. RF circuitry optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. Communication systems optionally communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. Wireless communication connections optionally use any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSDPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 102.11a, IEEE 102.11ac, IEEE 102.11ax, IEEE 102.11b, IEEE 102.11g and/or IEEE 102.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), spread spectrum technology such as FASST or DESST, or any other suitable communication protocol, including communication protocols not yet developed as of the filing date of this document.

While various embodiments of the present disclosure have been described above, it should be understood that they have been presented by way of example, and not limitation. It will be apparent to persons skilled in the relevant art that various changes in form and detail can be made therein without departing from the spirit and scope of the disclosure.

The present disclosure has been described above with the aid of functional building blocks illustrating the performance of specified functions and relationships thereof. The boundaries of these functional building blocks have often been arbitrarily defined herein for the convenience of the description. Alternate boundaries can be defined so long as the specified functions and relationships thereof are appropriately performed. Any such alternate boundaries are thus within the scope and spirit of the disclosure.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description of the present disclosure has been provided for the purposes of illustration and description. It is not intended to be exhaustive or to limit the disclosure to the precise forms disclosed. The breadth and scope of the present disclosure should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the disclosure and its practical application, thereby enabling others skilled in the art to understand the disclosure for various embodiments and with various modifications that are suited to the particular use contemplated. It is intended that the scope of the invention be defined by the following claims and their equivalence.

What is claimed is:

1. A method for supporting image processing for a movable object, comprising:
   acquiring one or more images captured by an imaging device borne by the movable object, wherein the imaging device is at least partially blocked by an obstructive object attached to the movable object;
   applying a template to the one or more images to obtain one or more projected locations of the obstructive object within the one or more images, the template including a pattern representing one or more projected locations of at least portion of the obstructive object during a rotational motion of the obstructive object; and
   detecting at least portion of the obstructive object at the one or more projected locations within the one or more images.

2. The method of claim 1, wherein the obstructive object includes at least a portion of a blade of a propeller system for providing a motion of the movable object.

3. The method of claim 2,
   wherein the blade comprises a plurality of markers made of a reflective material and distributed on a lower surface of the blade facing the imaging device;
   the method further comprising:
      illuminating the one or more markers on the blade using an illumination source mounted on the movable object.

4. The method of claim 3, wherein each of the plurality of markers is an arc stripe on a respective concentric circle of a plurality of concentric circles with a common central axis, around which the blade is configured to rotate.

5. The method of claim 4, wherein the plurality of markers comprise multiple groups of stripes with different widths, which are alternatingly distributed near an outer edge of the blade.

6. The method of claim 1, wherein the pattern comprises one or more lines respectively representing the one or more projected locations of the obstructive object during the rotational motion, each of the one or more lines being associated with a rotation angle of a corresponding one of the one or more projected locations.

7. The method of claim 6, wherein detecting the at least portion of the obstructive object at the one or more projected locations within the one or more acquired images comprises:
   detecting the at least portion of the obstructive object at the one or more projected locations within one of the one or more acquired images by determining whether the at least portion of the obstructive object is located on the one or more lines in the one of the one or more acquired images.

8. The method of claim 6, wherein a respective line of the one or more lines is a longitudinal axis of symmetry of the obstructive object.

9. The method of claim 6, wherein the template comprises a first group of markers distributed on the one or more lines, wherein markers distributed on a respective line of the one or more lines comprise a first set of markers located at centers of stripes on the obstructive object and a second set of markers located at centers of intervals between two adjacent stripes on the obstructive object.

10. The method of claim 9, wherein the template further comprises a second group of markers distributed on motion trails of the stripes on the obstructive object during the rotational motion of the obstructive object.

11. The method of claim 10, further comprising:
   collecting pixels of one of the one or more images corresponding to the first group of markers and the second group of markers in the template;
   determining whether pixel values of the collected pixels corresponding to each of the one or more lines satisfy predetermined criteria; and
   in accordance with a determination that the pixel values of the collected pixels corresponding to one of the one or more lines satisfy the predetermined criteria, identifying that the obstructive object exists at a rotation angle associated with the one of the one or more lines in the one of the one or more acquired images.

12. The method of claim 11, further comprising:
   comparing pixel values of the collected pixels in the one of the one or more acquired images with reference pixel values of corresponding reference pixels in the template.

13. The method of claim 11, further comprising:
   calculating statistical values of the pixel values of the collected pixels; and
   comparing the calculated statistical values with predetermined threshold values.

14. The method of claim 11, further comprising:
   determining whether a total number of pixels satisfying the predetermined criteria and distributed on the one of the one or more lines is greater than a predetermined threshold number; and
   in accordance with a determination that the total number of pixels distributed on the one of the one or more lines is greater than the predetermined threshold number, identifying that the obstructive object exists at a rotation angle associated with the one of the one or more lines in the one of the one or more acquired images.

15. The method of claim 11, further comprising:
   identifying an exposure type of the one of the one or more acquired images; and
   processing the one of the one or more acquired images in accordance with the identified exposure type.

16. The method of claim 15, wherein identifying the exposure type of the one of the one or more images comprises:
   determining whether the obstructive object is identified to exist at more than a predetermined number of angles within the one of the one or more images.

17. The method of claim 15, wherein processing the one of the one or more images comprises:

in accordance with a determination that the one of the one or more images is a short-exposure image, eliminating areas in the one of the one or more images corresponding to the obstructive object at one or more identified rotation angles.

18. A system for controlling a movable object, the system comprising:
  one or more processors; and
  a memory storing one or more programs that are configured to be executed by the one or more processors for:
    acquiring one or more images captured by an imaging device borne by the movable object, wherein the imaging device is at least partially blocked by an obstructive object attached to the movable object;
    applying a template to the one or more images to obtain one or more projected locations of the obstructive object within the one or more images, the template including a pattern representing one or more projected locations of at least portion of the obstructive object during a rotational motion of the obstructive object; and
    detecting at least portion of the obstructive object at the one or more projected locations within the one or more images.

19. An unmanned aerial vehicle (UAV), comprising:
  a propulsion system;
  an imaging device comprising an image sensor and an optical device; and
  one or more processors coupled to the propulsion system and the imaging device, the one or more processors configured for:
    acquiring one or more images captured by the imaging device borne by the UAV, wherein the imaging device is at least partially blocked by an obstructive object attached to the UAV;
    applying a template to the one or more images to obtain one or more projected locations of the obstructive object within the one or more images, the template including a pattern representing one or more projected locations of at least portion of the obstructive object during a rotational motion of the obstructive object; and
    detecting at least portion of the obstructive object at the one or more projected locations within the one or more images.

* * * * *